US007606683B2

(12) United States Patent
Bahel et al.

(10) Patent No.: US 7,606,683 B2
(45) Date of Patent: Oct. 20, 2009

(54) COOLING SYSTEM DESIGN SIMULATOR

(75) Inventors: Vijay Bahel, Sidney, OH (US); Peter F. Dexter, Sidney, OH (US); Altaf Hossain, Sidney, OH (US); Thomas E. Crone, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 694 days.

(21) Appl. No.: 10/765,820

(22) Filed: Jan. 27, 2004

(65) Prior Publication Data

US 2005/0165591 A1 Jul. 28, 2005

(51) Int. Cl.
*G06F 17/50* (2006.01)
*G05B 13/00* (2006.01)
*G05B 15/00* (2006.01)
*G05D 23/00* (2006.01)

(52) U.S. Cl. .................................. 703/1; 703/7; 700/276
(58) Field of Classification Search .................. 703/1, 703/7; 62/127, 190; 700/276
See application file for complete search history.

(56) References Cited

U.S. PATENT DOCUMENTS

| | | | |
|---|---|---|---|
| 3,350,928 A | 11/1967 | Fedde | |
| 3,708,998 A * | 1/1973 | Scherer et al. | 62/210 |
| 4,885,694 A * | 12/1989 | Pray et al. | 705/400 |
| 5,687,094 A * | 11/1997 | Kagawa et al. | 716/5 |
| 5,748,943 A | 5/1998 | Kaepp et al. | |
| 5,860,285 A | 1/1999 | Tulpule | |
| 6,209,794 B1 | 4/2001 | Webster et al. | |
| 6,272,868 B1 | 8/2001 | Grabon et al. | |
| 6,330,525 B1 | 12/2001 | Hays et al. | |
| 6,477,518 B1 | 11/2002 | Li et al. | |
| 6,487,525 B1 | 11/2002 | Hall et al. | |
| 6,505,475 B1 | 1/2003 | Zugibe et al. | |
| 6,510,698 B2 * | 1/2003 | Kasai et al. | 62/77 |
| 6,591,620 B2 | 7/2003 | Kikuchi et al. | |
| 6,629,008 B2 * | 9/2003 | Shiiba et al. | 700/100 |
| 6,629,420 B2 * | 10/2003 | Renders | 62/129 |
| 6,651,037 B1 | 11/2003 | Hall et al. | |
| 6,675,591 B2 | 1/2004 | Singh et al. | |
| 6,684,178 B2 | 1/2004 | DeRose et al. | |
| 6,698,663 B2 | 3/2004 | Wang et al. | |

(Continued)

FOREIGN PATENT DOCUMENTS

EP 1 211 617 A 5/2002

(Continued)

OTHER PUBLICATIONS

European Search Report for Application No. EP 03 25 2757, dated Mar. 11, 2004; 2 Pages.

(Continued)

*Primary Examiner*—Paul L Rodriguez
*Assistant Examiner*—Dwin M Craig
(74) *Attorney, Agent, or Firm*—Harness, Dickey & Pierce, P.L.C.

(57) ABSTRACT

A method of computer-based simulation of a cooling system includes inputting condenser parameters, evaporator parameters and compressor parameters for the cooling system and processing the condenser parameters, the evaporator parameters and the compressor parameters through a model of the cooling system. A flow control device is selected based on an output of the model.

60 Claims, 48 Drawing Sheets

U.S. PATENT DOCUMENTS

| | | | |
|---|---|---|---|
| 6,701,725 B2 * | 3/2004 | Rossi et al. .................... | 62/125 |
| 6,892,546 B2 | 5/2005 | Singh et al. | |
| 6,990,821 B2 * | 1/2006 | Singh et al. ................... | 62/129 |
| 7,010,926 B2 * | 3/2006 | Bahel et al. ................... | 62/127 |
| 2002/0040280 A1 * | 4/2002 | Morgan ....................... | 702/114 |
| 2002/0161776 A1 | 10/2002 | Lanfredi et al. | |
| 2003/0208341 A9 | 11/2003 | Simmons et al. | |
| 2004/0016252 A1 | 1/2004 | Singh et al. | |
| 2004/0129011 A1 * | 7/2004 | Kikuchi et al. ................ | 62/271 |

FOREIGN PATENT DOCUMENTS

| | | |
|---|---|---|
| EP | 1 229 479 A | 7/2002 |
| EP | 1 406 014 A2 | 4/2004 |
| JP | H9-257319 | 10/1997 |
| WO | WO 99/17178 | 8/1999 |

OTHER PUBLICATIONS

Emma May Sadler, Design Analysis of a Finned-Tube Condenser for a Residential Air-Conditioner Using R-22, Apr. 2000, 147 Pages.
Blue World Newletter; Date: Aug. 1998; Author not available.
Letter from Ulrike Sieger-Koser to Herr Ridder dated Apr. 2, 2002.
Fax from Sabine Dorsam to Hotel Steigenberger dated Apr. 12, 2002.
Adap-Kool; Date: Apr. 1989; Author not available.
System Software type AKM; Date: May 1992; Author not available.
Notice of Opposition to European Patent Application No. 03252757.4, dated Sep. 26, 2006.
Response to Notice of Opposition to European Patent Application No. 03252757.4, dated May 24, 2007.

* cited by examiner

| Evap. Temp.--> | -10°F | -5°F | 0°F | 5°F | 10°F | 15°F | 20°F | 25°F | 30°F | 35°F |
|---|---|---|---|---|---|---|---|---|---|---|
| 80°F Cond. | 7,800 | 9,460 | 11,290 | 13,450 | 15,850 | 18,430 | 21,250 | 24,320 | 27,560 | 30,960 |
| 90°F Cond. | 6,750 | 8,220 | 9,960 | 11,950 | 14,190 | 16,680 | 19,340 | 22,240 | 25,400 | 28,720 |
| 100°F Cond. | 5,880 | 7,170 | 8,720 | 10,540 | 12,620 | 14,940 | 17,510 | 20,250 | 23,240 | 26,480 |
| 110°F Cond. |  |  | 7,660 | 9,300 | 11,210 | 13,360 | 15,690 | 18,340 | 21,170 | 24,150 |
| 120°F Cond. |  |  |  | 8,170 | 9,880 | 11,790 | 14,030 | 16,430 | 19,090 | 22,000 |
| 130°F Cond. |  |  |  |  | 8,630 | 10,380 | 12,370 | 14,610 | 17,020 | 19,750 |
| 140°F Cond. |  |  |  |  |  | 8,960 | 10,790 | 12,780 | 15,020 | 17,510 |
| 150°F Cond. |  |  |  |  |  |  | 9,210 | 10,960 | 13,030 | 15,270 |

Scale Performance

Displacement Scaling Factor: 0.830
EER Scaling Factor: 1.050

Selection:
- Displacement
- EER
- Both

FIG 23

Tubing And Line Heat Transfer

Inside Tubing Diameter
- Liquid Line (in) — 0.38
- Vapor Line From Evaporator to Compressor (in) — 0.75
- Discharge Line From Compressor to Condenser (in) — 0.50

Equivalent Tubing Length
- Liquid Line (ft) — 38.0
- Vapor Line From Evaporator to Compressor (ft) — 38.0
- Discharge Line From Compressor to Condenser (ft) — 5.0

Shell Loss / Heat Transfer
- Compressor Shell Heat Loss Rate Factor — 0.10
- Heat Loss Rate in Compressor Discharge Line (Btu/hr) — 1000
- Heat Gain in Compressor Suction Line (Btu/hr) — 200
- Heat Loss Rate in Liquid Line (Btu/hr) — 200

OK    Cancel

FIG 24

Tubing And Line Heat Transfer

Inside Tubing Diameter

| | |
|---|---|
| Liquid Line (in) | 0.38 |
| Vapor Line From Reversing Valve to Condenser (in) | 0.75 |
| Vapor Line From Reversing Valve to Evaporator (in) | 0.75 |
| Suction Line From Reversing Valve to Compressor (in) | 0.75 |
| Discharge Line From Compressor to Reversing Valve (in) | 0.50 |

Equivalent Tubing Length

| | |
|---|---|
| Liquid Line (ft) | 38.0 |
| Vapor Line From Reversing Valve to Condenser (ft) | 38.0 |
| Vapor Line From Reversing Valve to Evaporator (ft) | 3.0 |
| Suction Line From Reversing Valve to Compressor (ft) | 3.0 |
| Discharge Line From Compressor to Reversing Valve (ft) | 5.0 |

Shell Loss / Heat Transfer

| | |
|---|---|
| Compressor Shell Heat Loss Rate Factor | 0.10 |
| Heat Loss Rate in Compressor Discharge Line (Btu/hr) | 1000 |
| Heat Gain in Compressor Suction Line (Btu/hr) | 200 |
| Heat Loss Rate in Liquid Line (Btu/hr) | 200 |

OK   Cancel

Condensing Unit Selection

Search / Selection — Condensing Unit Info — Components Detail

Search Criteria

- Refrigerant: R-22
- Temperature Range: All
- Hertz: All
- Phase: All
- Voltage: All

Physical Dimensions
- Length (in): (Min) — (Max)
- Width (in): (Min) — (Max)
- Height (in): (Min) — (Max)

Nominal HP: All HP

Capacity: 35978 (Btu/hr)
- +5 % @ Ambient Temp. (°F): 100
- −5 % Evap. Temp. (°F): 45

Compressor — Unit Model

Availability: All

Results In: Speed Sheet

[Search]   84 Units Found.   [Close]

Search Results

| No. | Condensing Unit   | Refrigerant | Hertz | Phase | Nominal HP | Temp. Range |
|-----|-------------------|-------------|-------|-------|------------|-------------|
| 1   | C3AH-0303-TAC-001 | R-22        | 60    | 3     | 3          | High        |
| 2   | C3AH-0303-TAC-007 | R-22        | 60    | 3     | 3          | High        |
| 3   | C3AH-0303-TAC-020 | R-22        | 60    | 3     | 3          | High        |
| 4   | C3AH-0303-TAC-042 | R-22        | 60    | 3     | 3          | High        |
| 5   | C3AH-0303-TAD-001 | R-22        | 60    | 3     | 3          | High        |
| 6   | C3AH-0303-TAD-006 | R-22        | 60    | 3     | 3          | High        |
| 7   | C3AH-0303-TAD-020 | R-22        | 60    | 3     | 3          | High        |
| 8   | C3AH-0303-TAD-042 | R-22        | 60    | 3     | 3          | High        |
| 9   | C3AH-0303-TAD-106 | R-22        | 60    | 3     | 3          | High        |
| 10  | C3AH-0303-TAD-107 | R-22        | 60    | 1     | 3          | High        |
| 11  | F3AD-A325-CFV-001 | R-22        | 60    | 3     | 3-1/4      | High        |

FIG 29

Condensing Unit Selection

Search / Selection — C3AH-0303-TAC-001 — Components Detail

Search Criteria

Refrigerant: R-22
Temperature Range: All
Hertz: All
Phase: All
Voltage: All

Physical Dimensions
- Length (in) ___ (Max)
- Width (in) ___ (Max)
- Height (in) ___ (Max)

Nominal HP
- All HP

Capacity
- 35978 (Btu/hr)
- +5 % @ Ambient Temp. (°F) 100
- -5 % Evap. Temp. (°F) 45

Compressor: ___  Unit Model: ___  Availability: All

Results In: Spread Sheet    [Search]

Search Results

| No. | Condensing Unit | Refrigerant | Hertz | Phase | Nominal HP | Temp. Range |
|-----|-----------------|-------------|-------|-------|------------|-------------|
| 1 | C3AH-0303-TAC-001 | R-22 | 60 | 3 | 3 | High |
| 2 | C3AH-0303-TAC-007 | R-22 | 60 | 3 | 3 | High |
| 3 | C3AH-0303-TAC-020 | R-22 | 60 | 3 | 3 | High |
| 4 | C3AH-0303-TAC-042 | R-22 | 60 | 3 | 3 | High |
| 5 | C3AH-0303-TAD-001 | R-22 | 60 | 3 | 3 | High |
| 6 | C3AH-0303-TAD-006 | R-22 | 60 | 3 | 3 | High |
| 7 | C3AH-0303-TAD-020 | R-22 | 60 | 3 | 3 | High |
| 8 | C3AH-0303-TAD-042 | R-22 | 60 | 3 | 3 | High |
| 9 | C3AH-0303-TAD-106 | R-22 | 60 | 3 | 3 | High |
| 10 | C3AH-0303-TAD-107 | R-22 | 60 | 3 | 3-1/4 | High |
| 11 | F3AD-A325-CFV-001 | R-22 | 60 | 1 | | High |

C3AH-0303-TAC-001
Voltage: 208/230
Compressor: ERF10310-TAC
Length (in) 39.0
Width (in) 30.0
Height (in) 29.5
Availability: Std. US OEM

[Close]

FIG 30

Condensing Unit Selection

Search / Selection: C3AH-0303-TAC-001

Components Detail

Electrical

| Field | Value |
|---|---|
| Frequency (Hz) | 60 |
| Phase | Three |
| Voltage | 208/230 |
| Maximum Fuse Size (amps) | 25.0 |
| Minimum Current Ampacity | 19.0 |

Mechanical

| Field | Value |
|---|---|
| Length (in) | 39.0 |
| Width (in) | 30.0 |
| Height (in) | 29.5 |
| Ship Weight (lb) | 403 |
| Liquid Connection Size (in) / Type | 1/2 F |
| Suction Connection Size (in) / Type | 1-1/8 S |
| Discharge Line Size (in) | 0.63 |

Performance

| Field | Value |
|---|---|
| Record Date | 4/5/2002 |
| Refrigerant | R-22 |
| Compressor | ERF1-0310-TAC |
| Air Flow Rate (Ft³/Min) | 4,090 |
| Return Gas Temp. (°F) | 65.0 |
| Subcooling (°F) | 5.0 |

| Evaporator Temp. (°F) | Capacity (Btu/hr) 90 °F Amb. | 100 °F Amb. | 110 °F Amb. | 120 °F Amb. |
|---|---|---|---|---|
| 0 | 14,750 | | | |
| 5 | 16,780 | | | |
| 10 | 18,950 | | | |
| 15 | 21,300 | | | |
| 20 | 23,800 | | | |
| 25 | 26,470 | | | |
| 30 | 29,300 | | | |
| 35 | 32,290 | | | |
| 40 | 35,440 | | | |
| 45 | 38,730 | | | |

FIG 31

Condensing Unit Selection

Search / Selection — C3AH-0303-TAC-001 — Components Detail

Compressor | Condenser | Accumulator

Coil Geometry

| Parameter | Value |
|---|---|
| Frontal Area (Ft²) | 4.79 |
| Number of Rows | 3 |
| Number of Equivalent Parallel Circuits | 3 |
| Horizontal Tube Spacing (Direction of Air Flow) (in) | 1.08 |
| Vertical Tube Spacing (Normal to Air Flow) (in) | 1.25 |
| Number of Return Bends | 30.2 |
| Fin Density (Fins/in) | 8 |
| Outside Diameter of Tubing (in) | 0.38 |
| Inside Diameter of Tubing (in) | 0.34 |
| Tubing | Smooth |
| Fin Type | Wavy |

Fan

| Parameter | Value |
|---|---|
| Air Flow Rate (Ft³/Min) | 4,090 |
| Motor Power Input (Watt) | 510 |

Entering Air: Dry Bulb Temperature (°F) 95.0 — Wet Bulb Temperature (°F) 75.0

Copeland Corporation
UnitSim - System Design Tool Inputs

General Information

| System | Air-Conditioning | Run Mode | Cooling | | Refrigerant | R-22 |
|---|---|---|---|---|---|---|

Inlet Air Conditions | Evaporator | Condenser | Other Parameters | |
|---|---|---|---|---|
| Entering (Dry bulb/Wet bulb) | 80.0°F / 67.0°F | 95.0°F / 75.0°F | Shell Heat Loss Factor | 0.100 |
| Air Flow Rate | 1200 Ft³/Min | 2800 Ft³/Min | Discharge Line Loss (Btu/hr) | 1.000 |
| Fan Power | 450 Watt | 250 Watt | Suction Line Gain (Btu/hr) | 200 |
| | | | Liquid Line Loss (Btu/hr) | 200 |

Heat Exchanger Geometry | Evaporator | Condenser | Compressor | |
|---|---|---|---|---|
| Frontal Area | 4.10 Ft² | 12.00 Ft² | Model | ZR34K3-PFV |
| Number of Rows | 3 | 2 | Type | Air-Conditioning |
| No. of Eqvt. Parallel Circuits | 6 | 4 | Application | Air-Conditioning |
| Fin Type | Wavy | Wavy | Voltage | 230 |
| Fin Density | 14 Fins/in | 13 Fins/in | Frequency | 60 |
| Tubing | Smooth | Smooth | Phase | 1 |

Performance Scaling Factors | | | Compressor Performance Scaling Factors | |
|---|---|---|---|---|
| Refrigerant-Side Heat Transfer | 1.000 | 1.000 | Displacement | 1.000 |
| Refrigerant-Side Pressure Drop | 1.000 | 1.000 | EER | 1.000 |
| Air-Side Heat Transfer | 1.000 | 1.000 | | |
| Air-Side Pressure Drop | 1.000 | 1.000 | | |

Flow Control

| | Subcooling | 15.0 °F | | Superheat | 15.0 °F |
|---|---|---|---|---|---|

Selected Option: Subcooling/Superheat

FIG 41

Sizes: Flow Control Devices

Thermal Expansion Valve (TXV)

| | |
|---|---|
| Rated Capacity of Thermal Expansion Valve (Ton) | 1.7 |
| Static Superheat Setting of TXV (°F) | 6.0 |
| Superheat at Rated Condition (°F) | 11.0 |
| Maximum Effective Operating Superheat (°F) | 13.0 |
| Bypass or Bleed Factor | 1.15 |

Capillary Tube

| | |
|---|---|
| Number of Capillary Tubes in Parallel | 1 |
| Inside Diameter of Capillary Tube (in) | 0.113 |
| Length of Capillary Tube (in) | 80.0 |

Orifice

| | |
|---|---|
| Number of Short Tube Orifices in Parallel | 1 |
| Inside Diameter of Short Tube Orifice (in) | 0.072 |
| Length of Short Tube Orifice (in) | 0.5 |

Emerson Flow Controls TXV Selection

COOLING SYSTEM DESIGN SIMULATOR

FIELD OF THE INVENTION

The present invention relates to cooling systems, and more particularly to simulating performance of a cooling system.

BACKGROUND OF THE INVENTION

Traditional cooling systems, such as refrigeration and air-conditioning systems, include a compressor, a condensing unit, an expansion valve and an evaporator. The compressor compresses gaseous refrigerant exiting the evaporator and discharges the high pressure refrigerant to the condensing unit. The condensing unit operates as a heat exchanger enabling heat transfer from the gaseous refrigerant to a heat sink (e.g., air or water). The refrigerant condenses within the condensing unit and a state change occurs from gas to liquid. The liquid refrigerant exits the condensing unit and flows to the evaporator through the expansion valve. The evaporator also operates as a heat exchanger enabling heat transfer from the atmosphere surrounding the evaporator to the liquid refrigerant. As the heat transfer occurs, the temperature of the refrigerant increases until a state change occurs from liquid to gas. The gas refrigerant is drawn into the suction side of the compressor and the cooling cycle continues.

In order to competently design a new cooling system or maintain an existing cooling system, the potential performance of the individual components within the system need be estimated. Traditionally, system components are selected based on the refrigerant type and ratings provided by the manufacturer. However, these ratings are determined under fixed conditions and not actual system operational conditions. Therefore, although the rating of a component may suggest that it is proper for the particular cooling system, the actual performance of that component within the cooling system may be far less than optimal.

SUMMARY OF THE INVENTION

Accordingly, the present invention provides a method of computer-based simulation of a cooling system. The method includes inputting condenser parameters, evaporator parameters and compressor parameters for the cooling system. The condenser parameters, the evaporator parameters and the compressor parameters are processed through a model of the cooling system. A flow control device is selected based on an output of the model.

In one feature, the flow control device includes one of a capillary tube device and an orifice device.

In another feature, the method further includes selecting a flow control parameter including a sub-cooling temperature and a superheat temperature.

In another feature, the step of selecting a flow control device includes generating a list of available flow control devices based on the output and selecting the flow control device from the list of available flow control devices.

In another feature, the method further includes inputting refrigerant properties for a refrigerant flowing through the cooling system. The output is further based on the refrigerant properties. The refrigerant properties include refrigerant charge and one of refrigerant superheat temperature and refrigerant sub-cooling temperature.

In another feature, the step of inputting condenser parameters includes generating a list of available condensers, selecting a condenser from the list of available condensers and automatically inputting the condenser parameters based on the selected condenser.

In another feature, the step of inputting compressor parameters includes generating a list of available compressors based on search parameters, selecting a compressor from the list of available compressors and automatically inputting the compressor parameters based on the selected compressor. The search parameters include at least one of a model number, a voltage, a phase, a frequency, a refrigerant type, an application type and a capacity. The search parameters include a capacity and a capacity tolerance.

In another feature, the method further includes inputting tubing and line heat transfer parameters. the output is further based on the tubing and line heat transfer parameters.

In still another feature, the method further includes inputting accumulator parameters. The output is further based on the accumulator parameters.

In yet another feature, the condenser parameters and the compressor parameters are input as air-cooled condensing unit parameters. The method further includes generating a list of available air-cooled condensing units, selecting an air-cooled condensing unit from the list of available air-cooled condensing units and automatically inputting the air-cooled condensing unit parameters based on the selected air-cooled condensing unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

Figure 4:
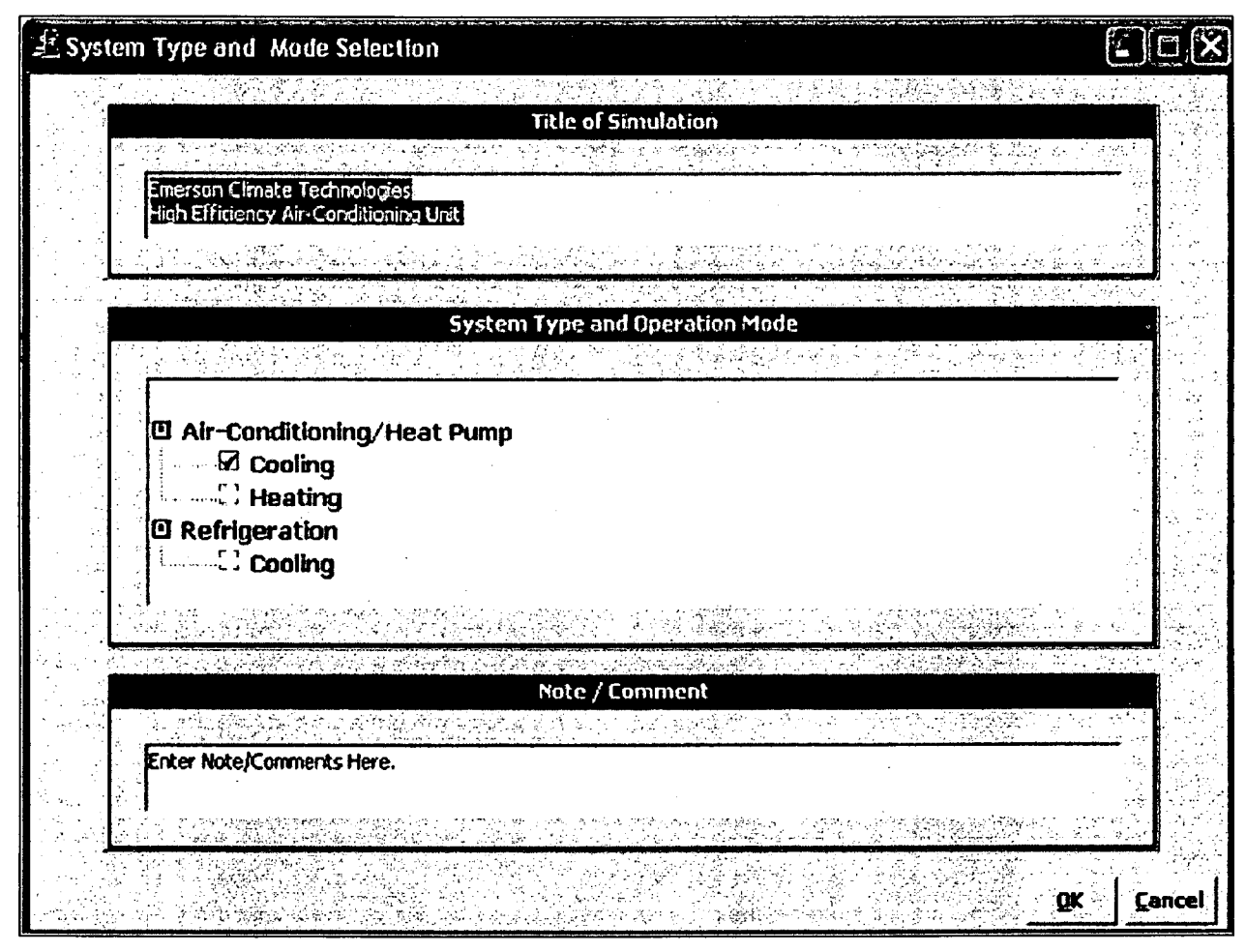

FIG. 4 is a screen-shot illustrating system type and operation mode inputs;

FIG. 15 is a screen-shot illustrating a condenser database;

FIG. 16 is a screen-shot illustrating compressor search and selection inputs;

FIG. 17 is a screen-shot illustrating compressor search results;

FIG. 18 is a screen-shot illustrating compressor rated capacity values;

FIG. 19 is a screen-shot illustrating compressor rated power values;

FIG. 20 is a screen-shot illustrating compressor search inputs based on user specified capacity;

FIG. 21 is a screen-shot illustrating compressor displacement and EER scaling;

FIG. 23 is a screen-shot illustrating re-rated compressor capacity;

FIG. 24 is a screen-shot illustrating cooling mode tubing and line heat transfer inputs;

FIG. 25 is a screen-shot illustrating heating mode tubing and line heat transfer inputs;

FIG. 26 is a screen-shot illustrating an accumulator database;

FIG. 29 is a screen-shot illustrating ACU selection inputs;

FIG. 30 is a screen-shot illustrating a selected ACU summary;

FIG. 31 is a screen-shot illustrating ACU components details;

FIG. 34 is a screen-shot illustrating ACU condenser details;

FIG. 35 is a screen-shot illustrating ACU key features;

FIG. 37 is a screen-shot illustrating ACU search results based on the ACU's capacity;

FIG. 40 is a screen-shot illustrating refrigerant liquid properties inputs;

FIG. 41 is a screen-shot illustrating key simulation inputs;

FIG. 44 is a screen-shot illustrating sizes of flow control devices based on the simulation results;

FIG. 45 is a screen-shot illustrating thermal expansion valve (TXV) selection based on the simulation results;

FIG. 46 is a screen-shot illustrating a psychrometric calculator used to calculate moist air properties;

FIG. 48 is a screen-shot illustrating manufacturer engineering bulletins provided by the cooling system design simulator.

DETAILED DESCRIPTION OF THE PREFERRED EMBODIMENTS

The following description of the preferred embodiments is merely exemplary in nature and is in no way intended to limit the invention, its application, or uses.

Figure 1:
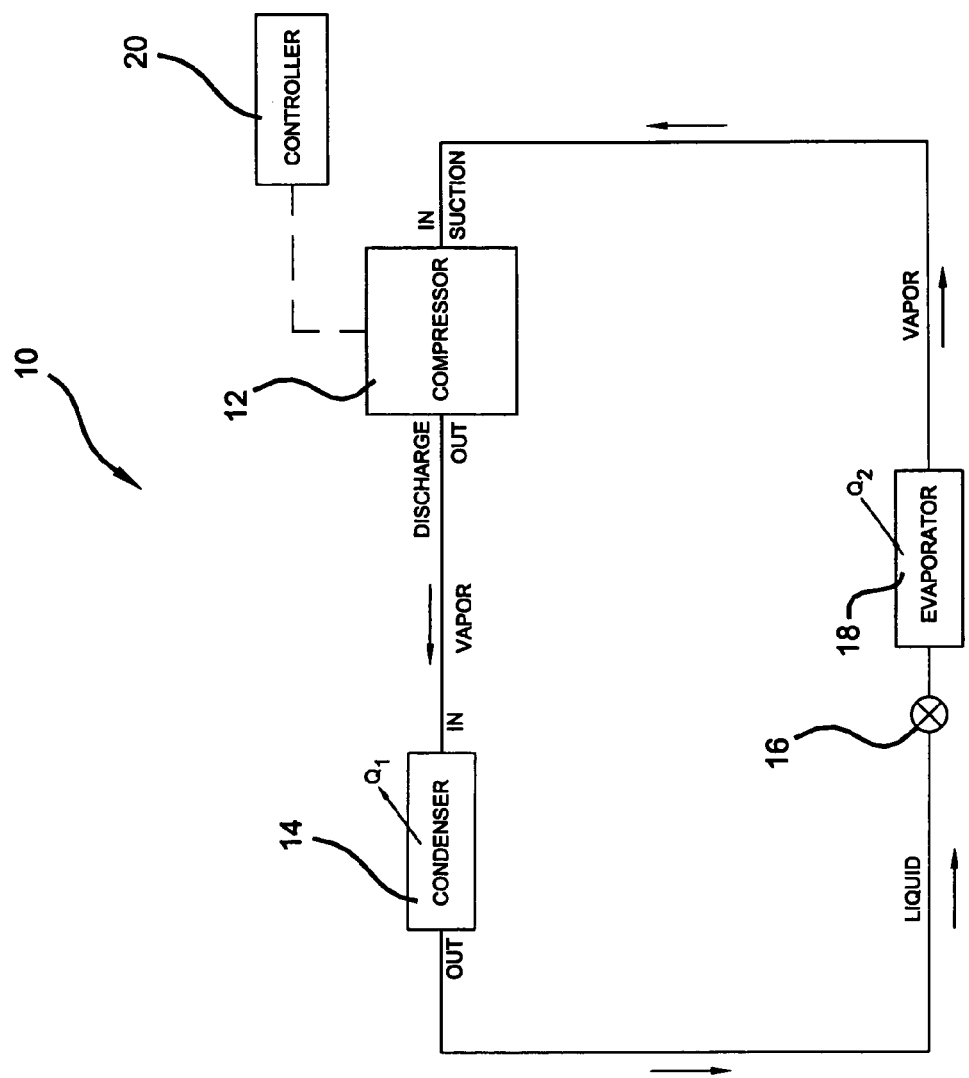
FIG. 1 is a schematic illustration of an exemplary cooling system.

Referring now to FIG. 1, a generic cooling system 10 includes a compressor 12, a condenser 14, an expansion valve 16 and an evaporator 18. The compressor 12 is controlled by a controller 20 and compresses gaseous refrigerant exiting the evaporator 18. The compressor 12 discharges the high pressure refrigerant to the condenser 14. The condenser 14 operates as a heat exchanger enabling heat transfer ($Q_1$) from the gaseous refrigerant to a heat sink (e.g. air or water). The refrigerant condenses within the condenser 14 and a state change occurs from gas to liquid. The liquid refrigerant exits the condenser 14 and flows to the evaporator 18 through the expansion valve 16. The evaporator 18 also operates as a heat exchanger enabling heat transfer ($Q_2$) from the atmosphere surrounding the evaporator 18 to the liquid refrigerant. As the heat transfer occurs, the temperature of the refrigerant increases until a state change occurs from liquid to gas. The gas refrigerant is drawn into the suction side of the compressor 12 and the cooling cycle continues.

The cooling system design simulator includes a series of sub-routines to determine the performance of the individual components of exemplary cooling systems and the cooling system 10 as a whole. More particularly, the design simulator performs steady-state design and analysis of vapor compression air-to-air-systems operating in either heating and cooling modes. A cooling system model is based on underlying physical principles and generalized correlations to avoid the limitations of empirical correlations derived from manufacturer specifications. As a hardware-based model, a user can specify the individual component parameters and define the geometry of tubing connecting the cooling system components. The design simulator is preferably provided as a software-based computer program. More specifically, the design simulator is preferably a Windows interface that is functionality integrated in the software to enable quick cooling system design. Other complimentary functions are integrated to streamline design efforts. These include, but are not limited to look-up tables for refrigerant and psychrometric properties of air.

Figure 2:
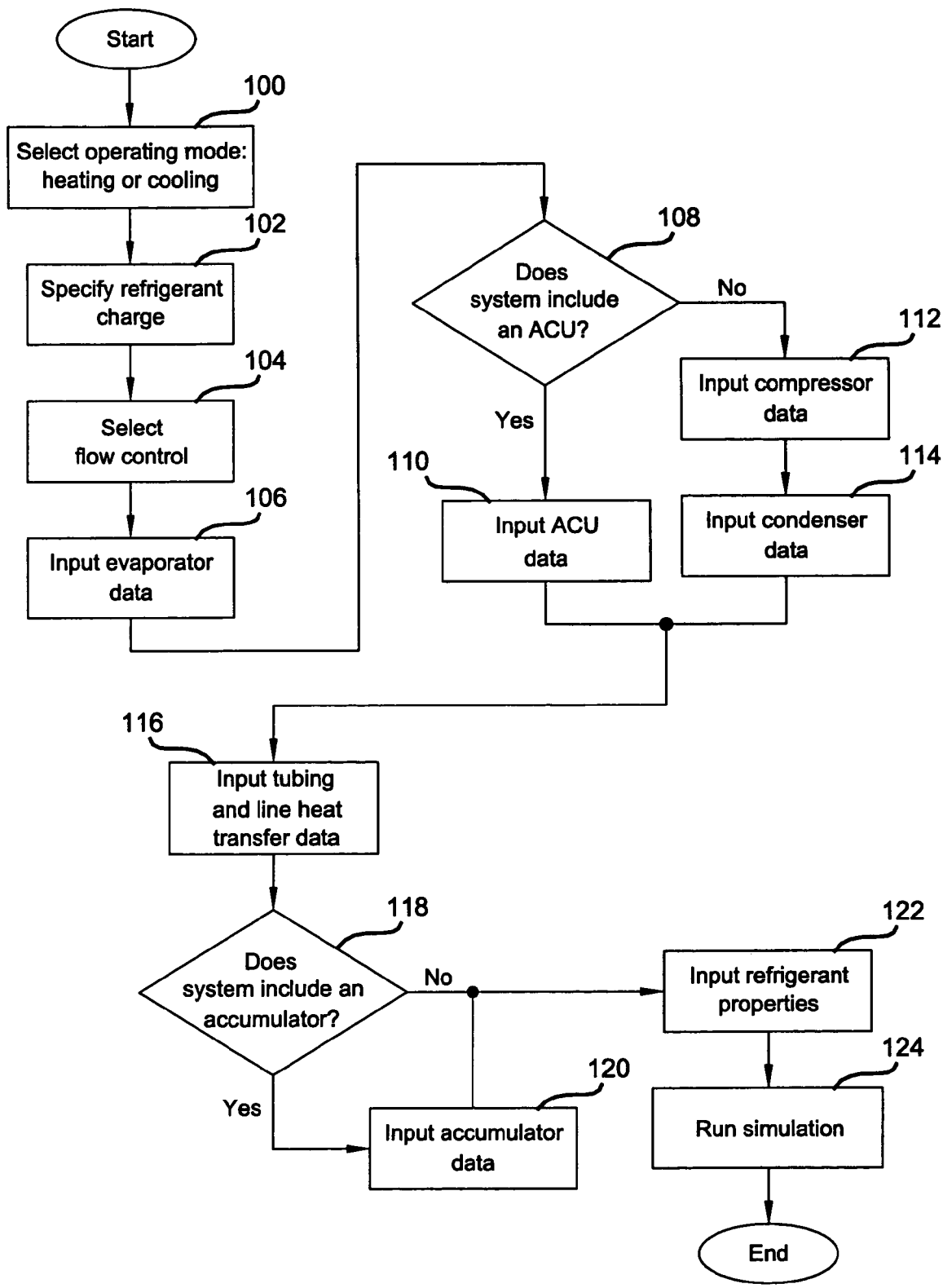
FIG. 2 is a flowchart illustrating general steps of a cooling system design simulator according to the present invention.

Referring now to FIG. 2, a flowchart illustrates the general steps of the cooling system design simulator. In step 100, the user selects the operating mode of the cooling system (i.e., cooling or heating). In step 102, the user specifies the refrigerant charge. The user selects the flow control in step 104. In step 106, the user inputs evaporator data and determines whether the cooling system includes an air-cooled condensing unit (ACU) in step 108. If the cooling system does include an ACU, the simulator continues in step 110. If the cooling system does not include an ACU, the simulator continues in step 112.

In step 110, the user inputs the ACU data. In step 112, the user inputs compressor data and the user inputs condenser data in step 114. In step 116, the user inputs tubing and line heat transfer data for the plumbing between components of the cooling system. In step 118, the user determines whether the cooling system includes an accumulator. If the cooling system does include an accumulator, the simulator continues in step 120. If the cooling system does not include an accumulator, the simulator continues in step 122. In step 120, the user inputs accumulator data. In step 122, the user inputs refrigerant properties. In step 124, the user runs the simulation based on the input data and simulation ends.

Figure 3:
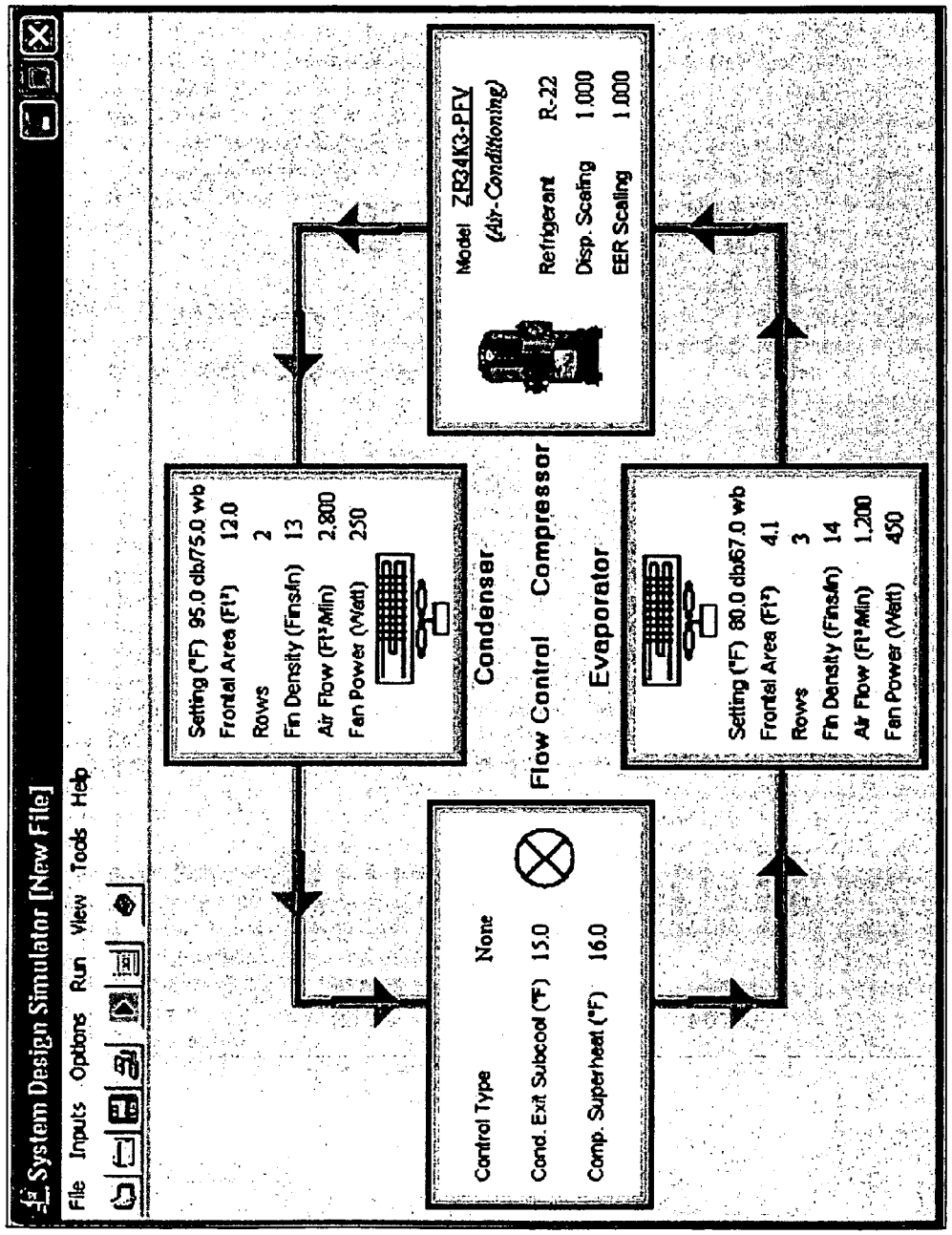
FIG. 3 is a screen-shot illustrating software-based input of cooling system component information.

Referring now to FIGS. 3 through 45, the cooling system design simulator will be described in further detail. FIGS. 3 through 45 generally provide screen-shots of a software-based implementation of the cooling system design simulator. More particularly, FIG. 3 is a screen-shot illustrating a generic cooling system schematic. As similarly described above with reference to FIG. 1, the cooling system schematic includes a condenser, a flow control device, an evaporator and a compressor. The cooling system can be simulated in either a cooling mode or a heating mode. The user selects the operating mode by clicking on Inputs in the toolbar and selecting the System Type and Operation Mode option. FIG. 4 illustrates a screen-shot of a system type and mode screen. The user can select between an A/C system operating in respective cooling and heating modes or a refrigeration system operating in a cooling mode. The user can also enter a simulation title and notes.

Figure 5:
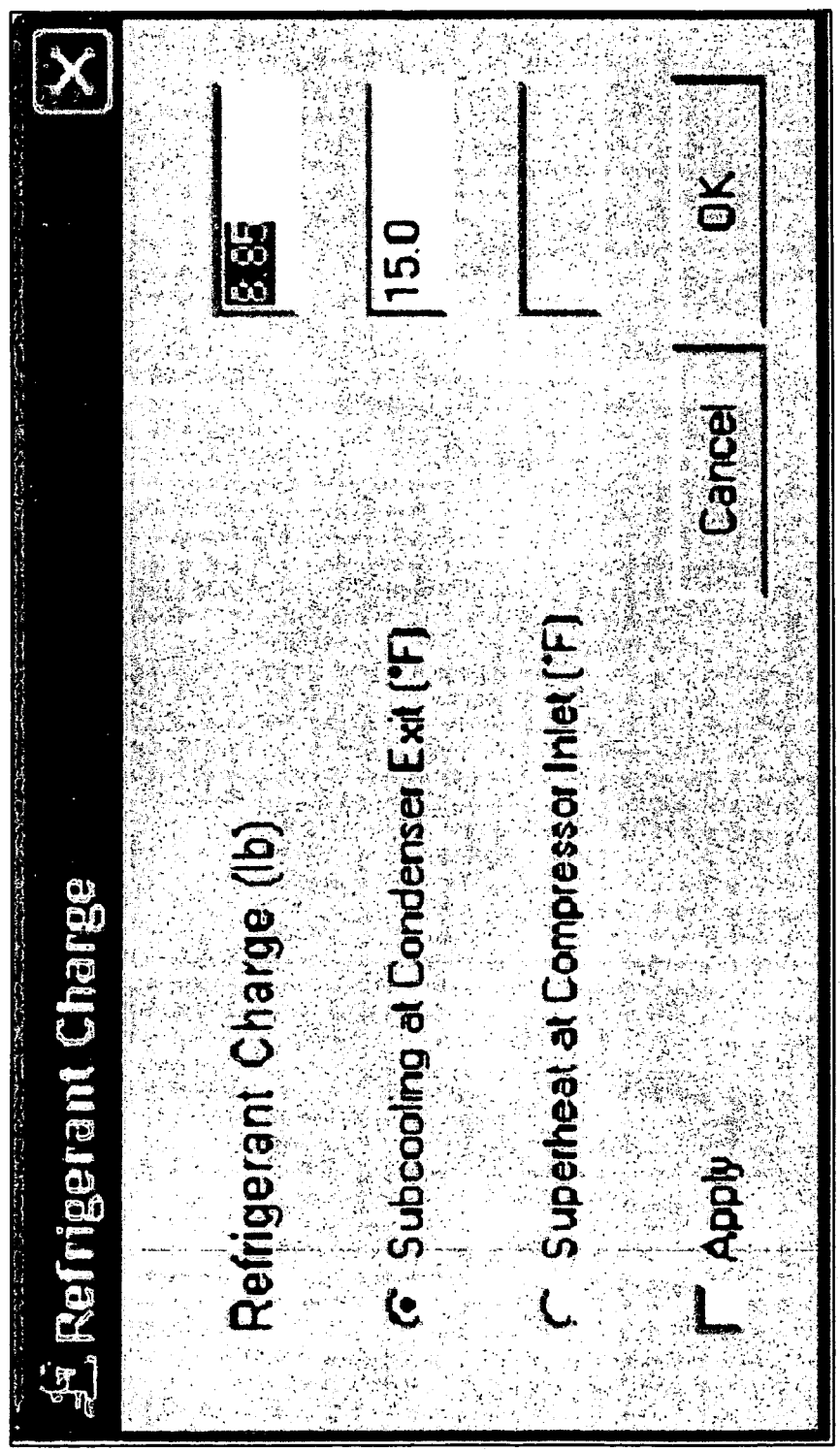
FIG. 5 is a screen-shot illustrating refrigerant charge inputs.

The user can specify the refrigerant charge for the cooling system or have the simulator calculate the refrigerant charge from the other system parameters. The user can input the refrigerant charge data by clicking on Inputs in the toolbar and selecting the Specify Refrigerant Charge and Edit Inputs option. FIG. 5 illustrates a screen-shot of the refrigerant charge menu. The user can input the refrigerant charge in lbs and either the sub-cooling temperature (° F.) at the condenser discharge or the superheat temperature (° F.) at the compressor inlet.

The simulator enables the user to select between flow control device options. The options include capillary tube and orifice. Alternatively, the user can specify flow control parameters including the condenser discharge sub-cooling temperature (° F.) and the compressor inlet superheat temperature (° F.). The simulator calculates the equivalent Thermal Expansion Valve (TXV), capillary tube and orifice sizes to achieve these conditions, as described in further detail below. The flow control is selected by clicking on Inputs in the toolbar and choosing the Flow Control menu or by clicking on the flow control illustration.

Figure 6:
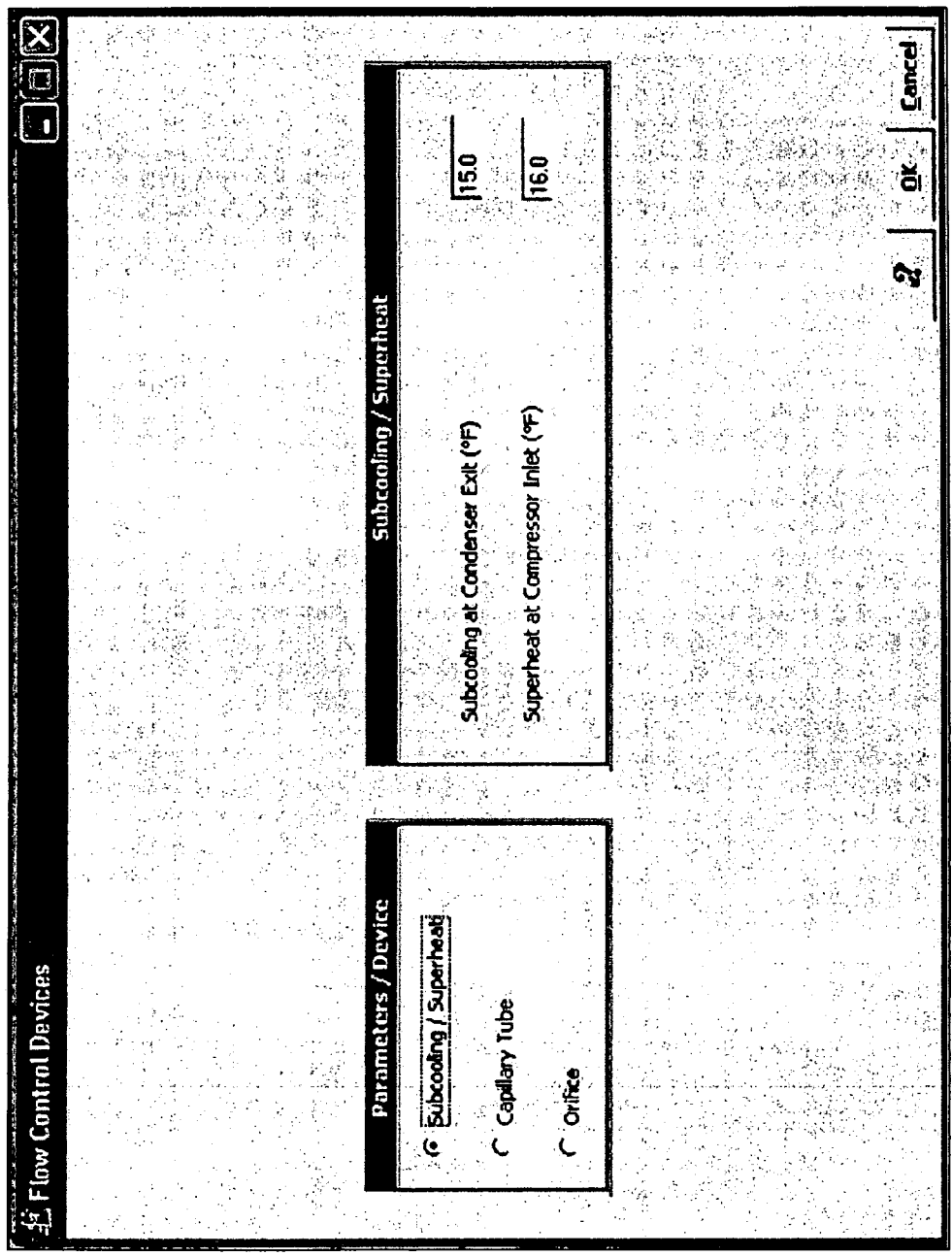
FIG. 6 is a screen-shot illustrating sub-cooling and superheat parameter inputs for flow control.
Figure 7:
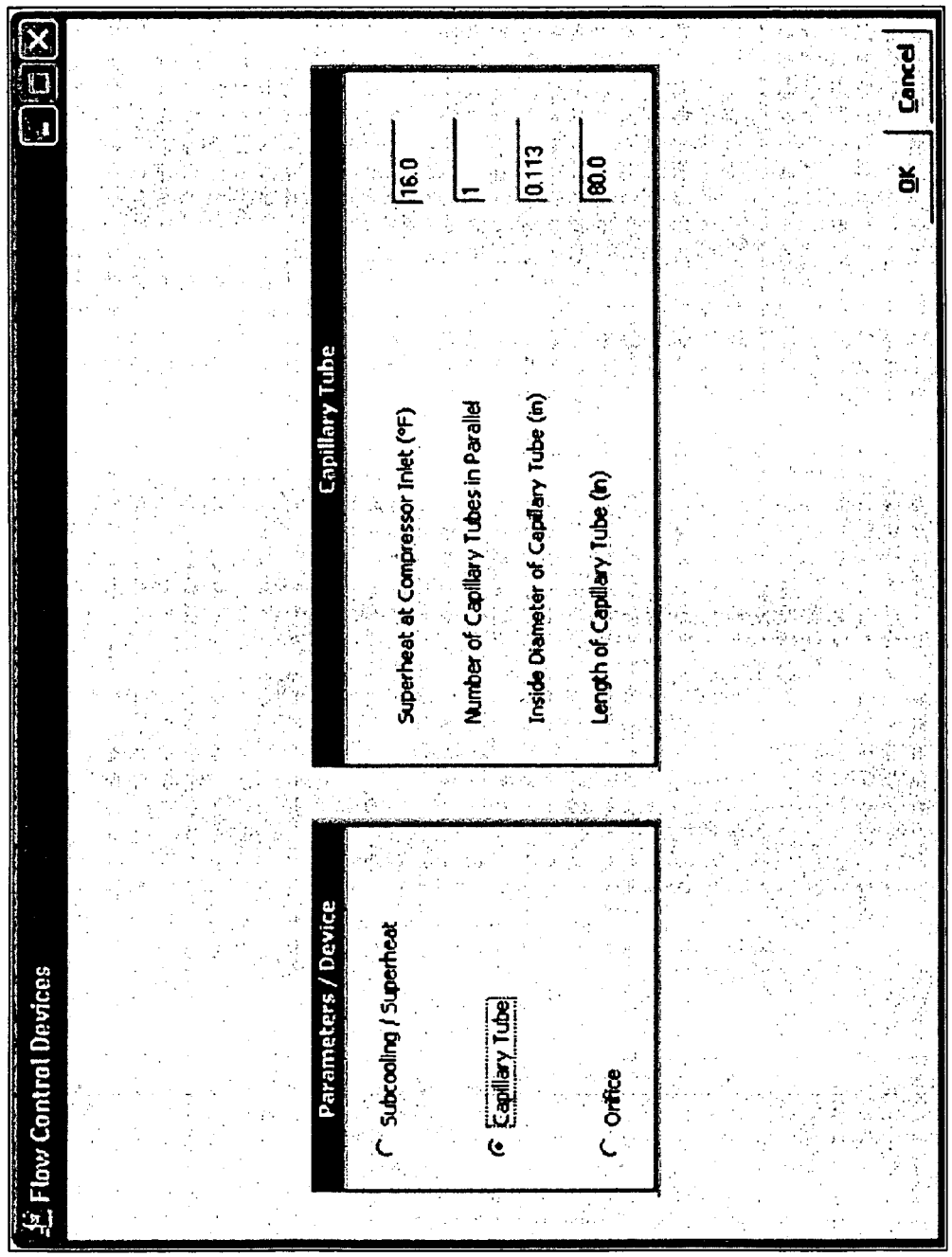
FIG. 7 is a screen-shot illustrating capillary tube flow control device inputs.
Figure 8:
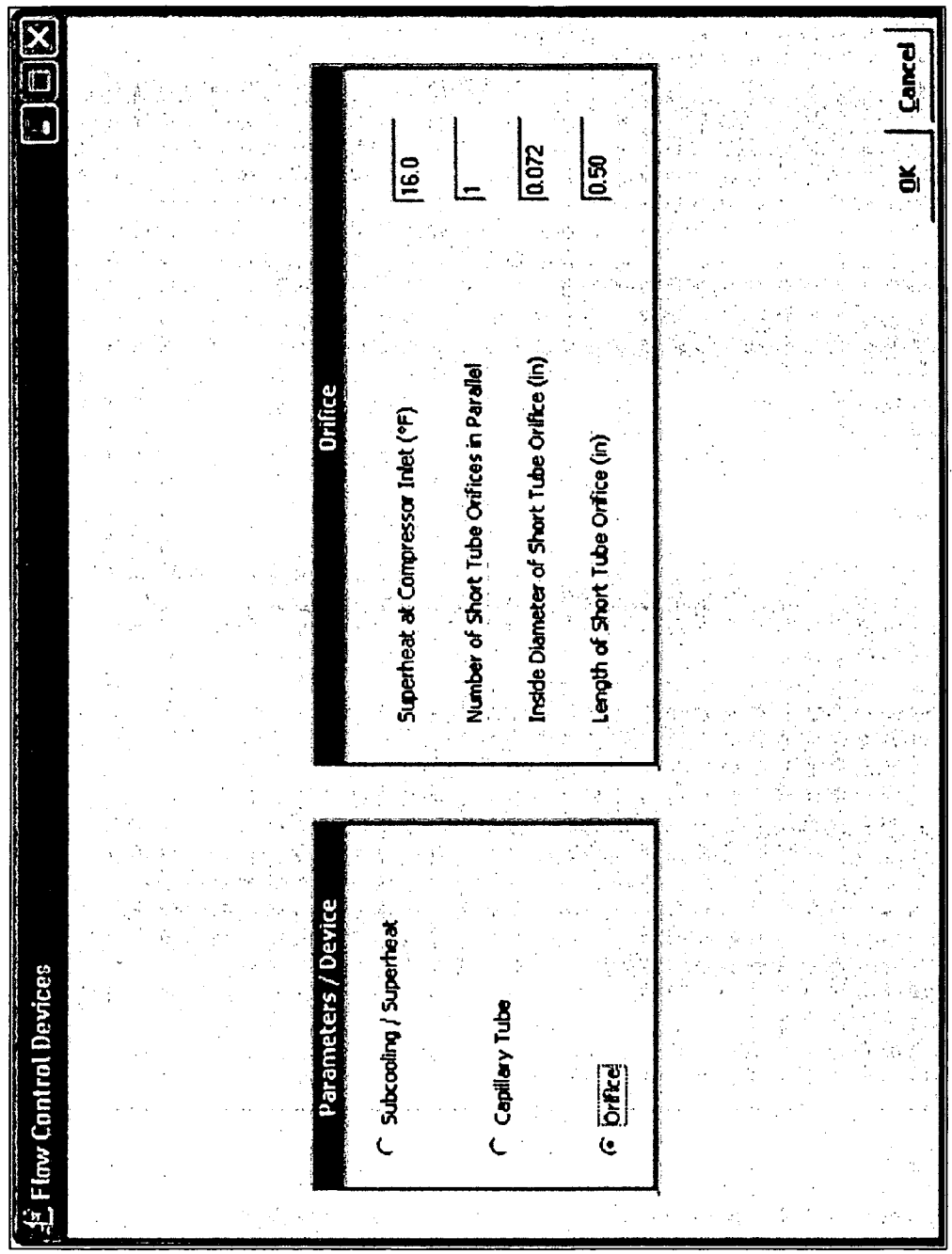
FIG. 8 is a screen-shot illustrating orifice flow control device inputs.

FIG. 6 provides a screen-shot of the Flow Control Devices screen with the sub-cooling/superheat parameters option selected. The user inputs the sub-cooling and superheat temperatures. FIG. 7 provides a screen-shot of the Flow Control Devices screen with the capillary tube device selected. The user inputs the superheat temperature, number of parallel capillary tubes, inside diameter of the capillary tube(s) and the length of the capillary tube(s). FIG. 8 provides a screen-shot of the Flow Control Devices screen with the orifice device selected. The user inputs the superheat temperature, the number of parallel short tube orifices, the inside diameter of the short tube orifice(s) and the length of the short tube orifice(s).

The data for the evaporator is entered by opening the evaporator screen. The user can access this screen by either choosing Inputs on the toolbar and the Evaporator option or by clicking on the evaporator image. The evaporator requires several inputs that are grouped into three categories: (i) entering air condition (dry bulb and wet bulb temperature) and air flow rate/fan power, (ii) heat exchanger physical properties and (iii) scaling factors to adjust simulation results to match with measured system performance data. Expert tips are included on each input screen to help the user streamline their design efforts. The expert tips are accessed by choosing the icon with question mark.

Figure 9:
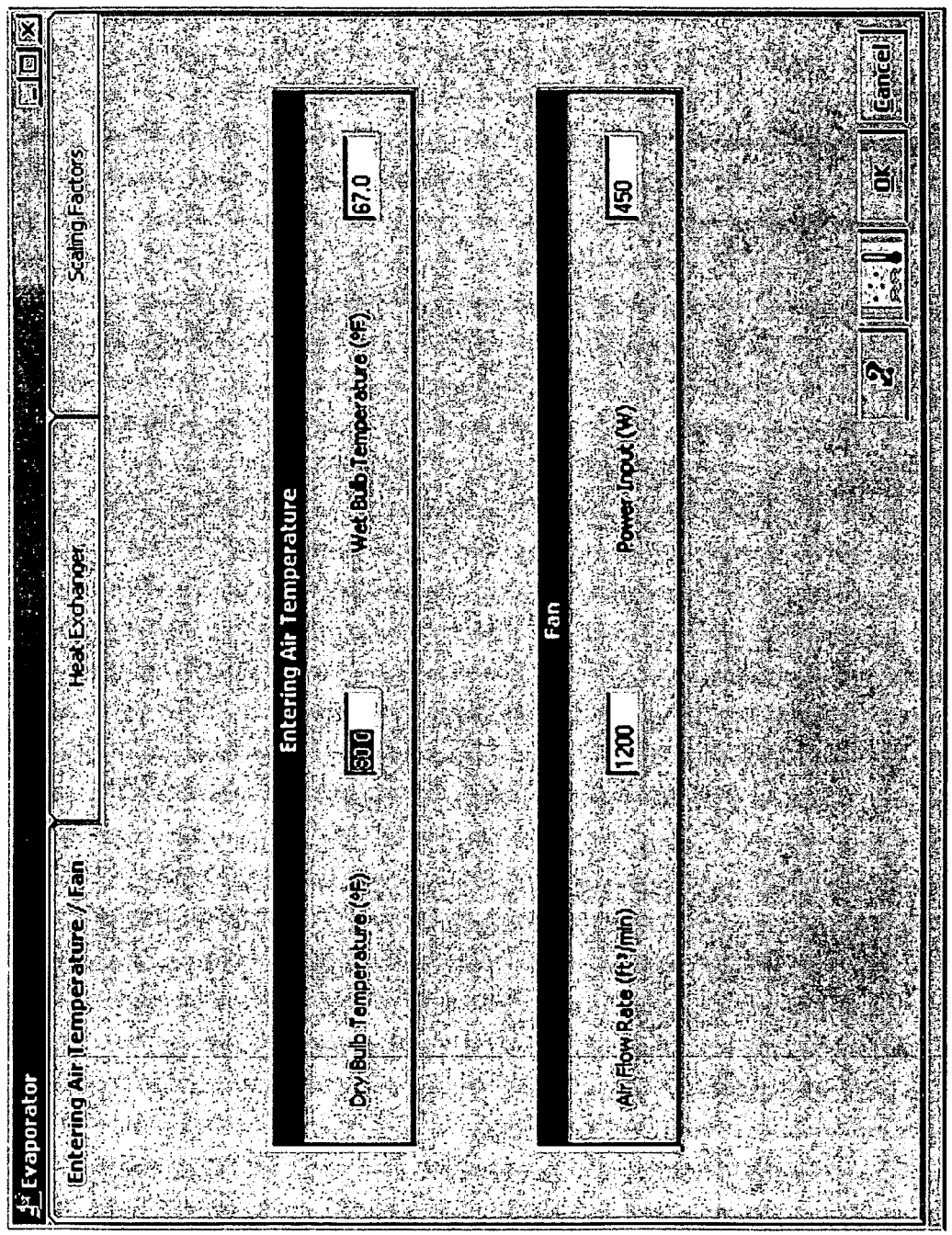
FIG. 9 is a screen-shot illustrating evaporator entering air temperature and air flow inputs.

FIG. 9 provides a screen-shot of an Entering Air and Fan input screen. The user inputs the entering air information including the dry bulb temperature (° F.) and the wet bulb temperature (° F.). The user also inputs the fan information including the air flow rate (Ft$^3$/Min) and power input (Watts).

Figure 10:
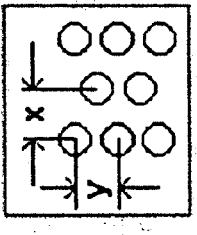
FIG. 10 is a screen-shot illustrating evaporator heat exchanger inputs.

FIG. 10 provides a screen-shot of a Heat Exchanger input screen. The user inputs geometry information including frontal area (Ft$^2$), number of rows, number of equivalent, parallel refrigerant circuits, horizontal tube spacing, vertical tube spacing and number of return bends. The geometry information further includes fin density, outside diameter of tubing, inside diameter of tubing, tubing type (e.g., smooth, rifled) and fin type (e.g., smooth, wavy, louvered).

Figure 11:
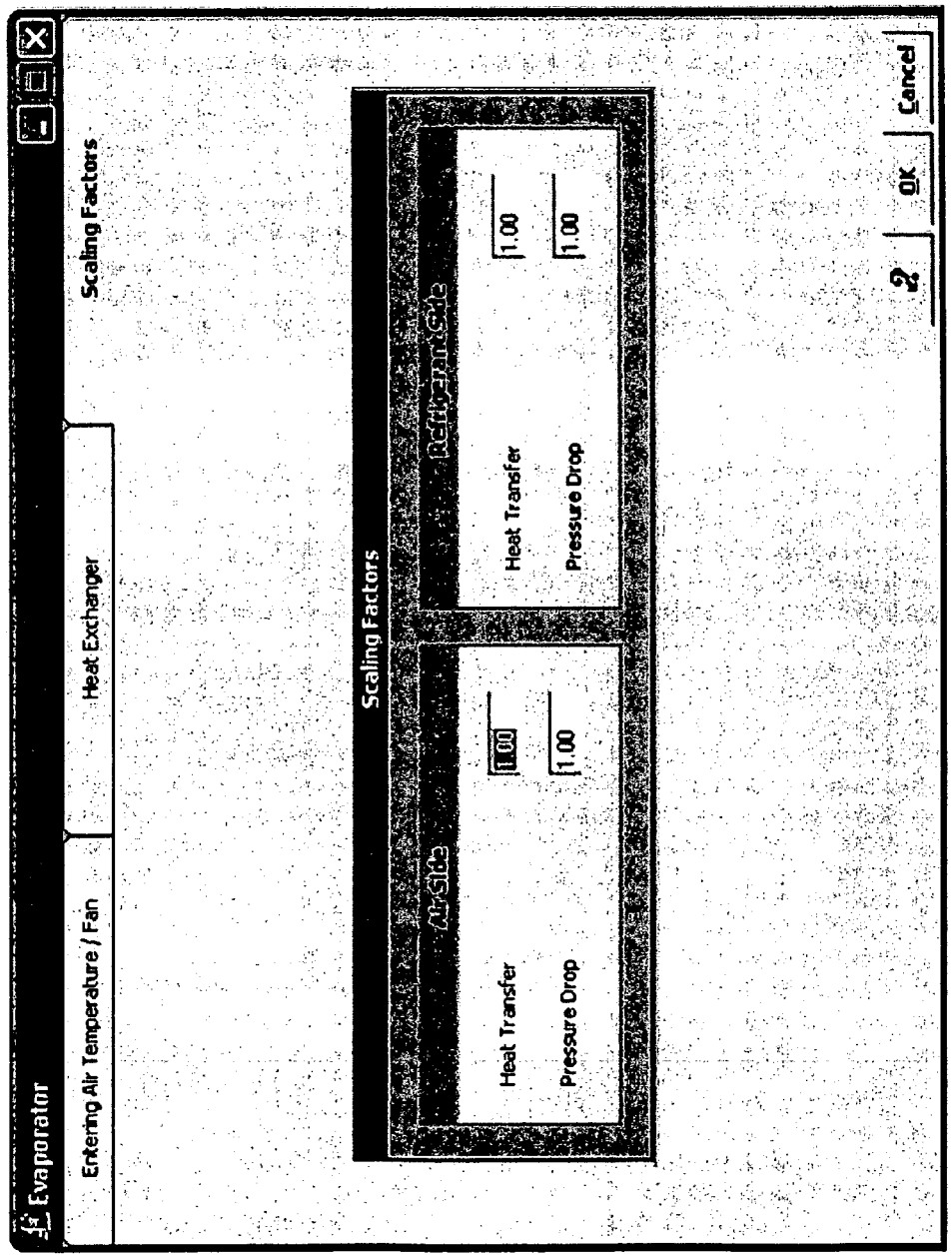
FIG. 11 is a screen-shot illustrating evaporator scaling factor inputs.

FIG. 11 provides a screen-shot of a Scaling Factors input screen. The scaling factors are divided into air side and refrigerant side groups. The air side group includes heat transfer and pressure drop scaling factors. The refrigerant side group also includes heat transfer and pressure drop scaling factors. The scaling factors enable the user to adjust the simulation results to match measured system performance.

Figure 12:
FIG. 12 is a screen-shot illustrating condenser entering temperature and air flow inputs.

The data for the condenser is entered by opening the condenser screen. The user accesses this screen either by choosing Inputs on the toolbar and the Condenser menu or by clicking on the condenser image on the main screen. This opens a condenser dialog screen, which is illustrated in FIG. 12. Initially, the user inputs entering air temperature data and fan parameters. The entering air temperature data includes dry bulb temperature (° F.) and wet bulb temperature (° F.). The fan parameters include air flow rate (ft$^3$/min) and power input (Watts).

Figure 13:
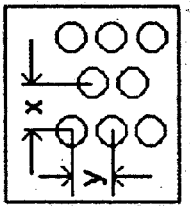
FIG. 13 is a screen-shot illustrating condenser heat exchanger inputs.

FIG. 13 provides a screen-shot of a Condenser Heat Exchanger input screen. The user inputs geometry information including frontal area (Ft$^2$), number of rows, number of equivalent parallel refrigerant circuits, horizontal tube spacing, vertical tube spacing and number of return bends. The geometry information further includes fin density, outside diameter of tubing, inside diameter of tubing, tubing type (e.g., smooth, rifled) and fin type (e.g., smooth, wavy, louvered).

Figure 14:
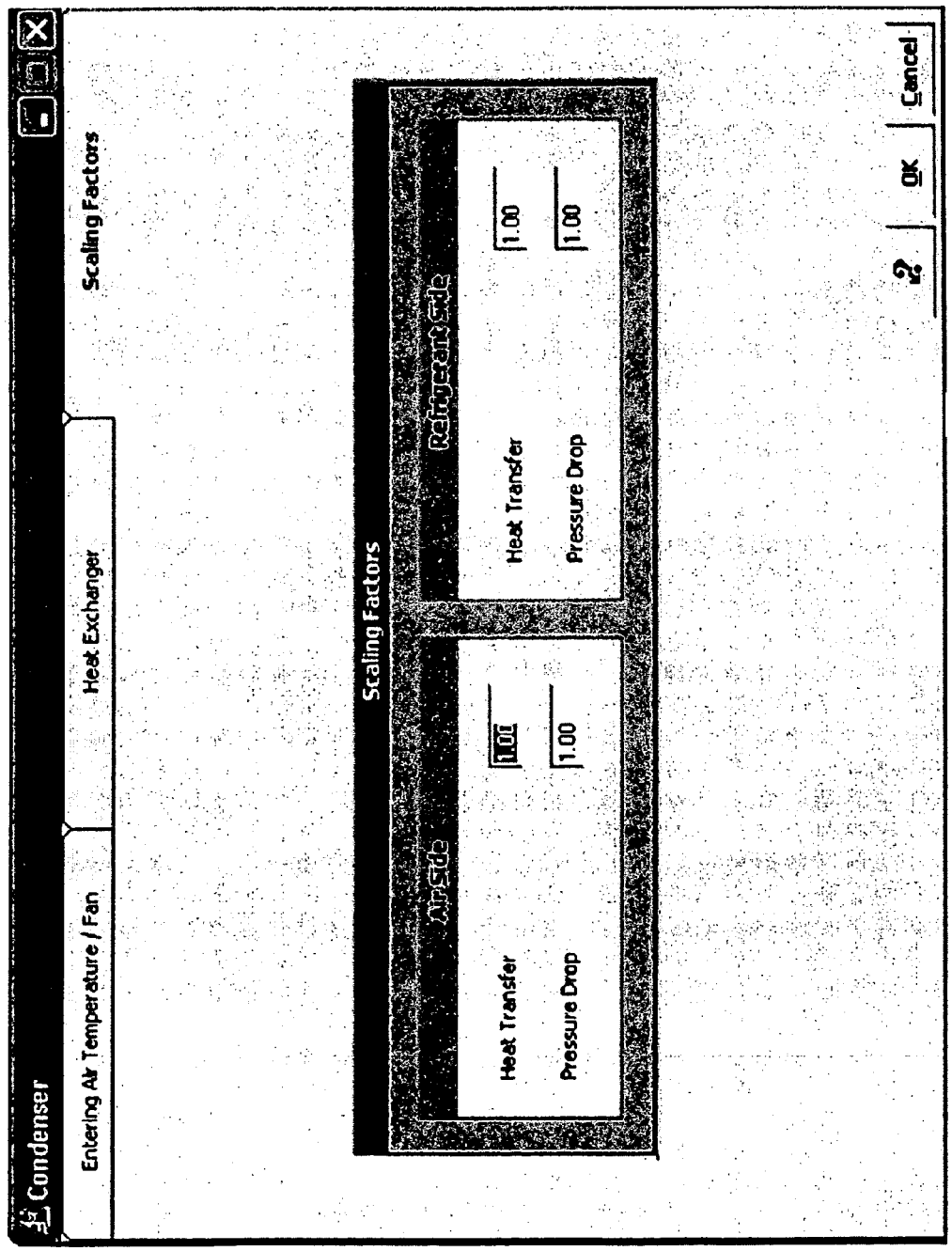
FIG. 14 is a screen-shot illustrating condenser scaling factor inputs.

FIG. 14 provides a screen-shot of a condenser Scaling Factors input screen. The scaling factors are divided into air side and refrigerant side groups. The air side group includes heat transfer and pressure drop scaling factors. The refrigerant side group also includes heat transfer and pressure drop scaling factors. The scaling factors enable the user to adjust the simulation results to match laboratory measured system performance.

Figure 15:
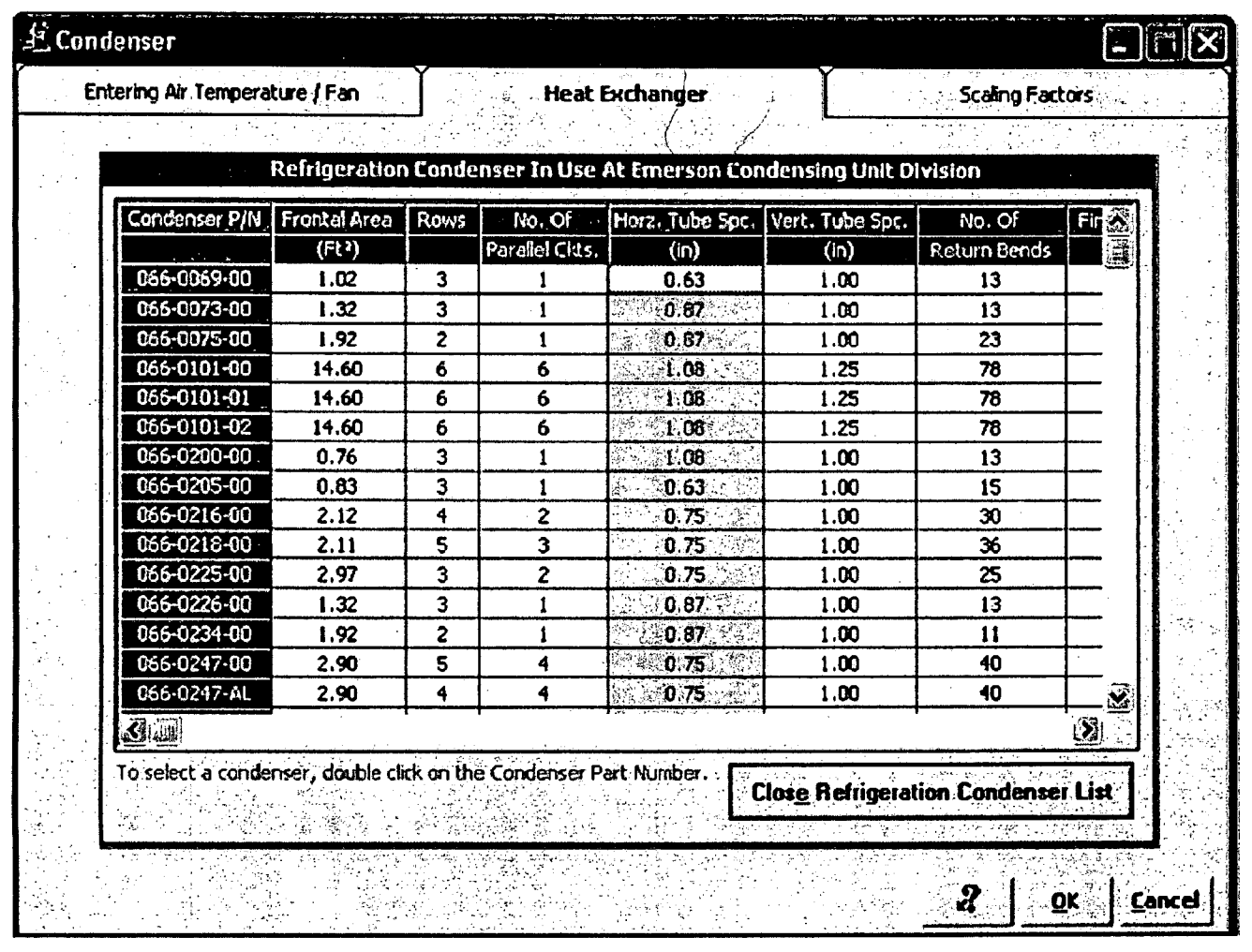

Referring now to FIG. 15, the user can select a specific condenser from a list of available models. The user accesses a database by clicking on the Show Refrigeration Condenser List button on the bottom right corner of Heat Exchanger input screen. A table with condenser information appears. The user scrolls through the condenser list to find the condenser model that meets system requirements. The condenser list is initially ordered by condenser part number. The user can re-order the condenser list by another parameter by clicking on that parameter in the top row of condenser list. Condenser geometry parameters are automatically entered in the appropriate fields of the Condenser screen when user selects a condenser by double clicking on the condenser part number. An engineering drawing of a particular condenser (no shown) is provided at the users request.

Figure 16:
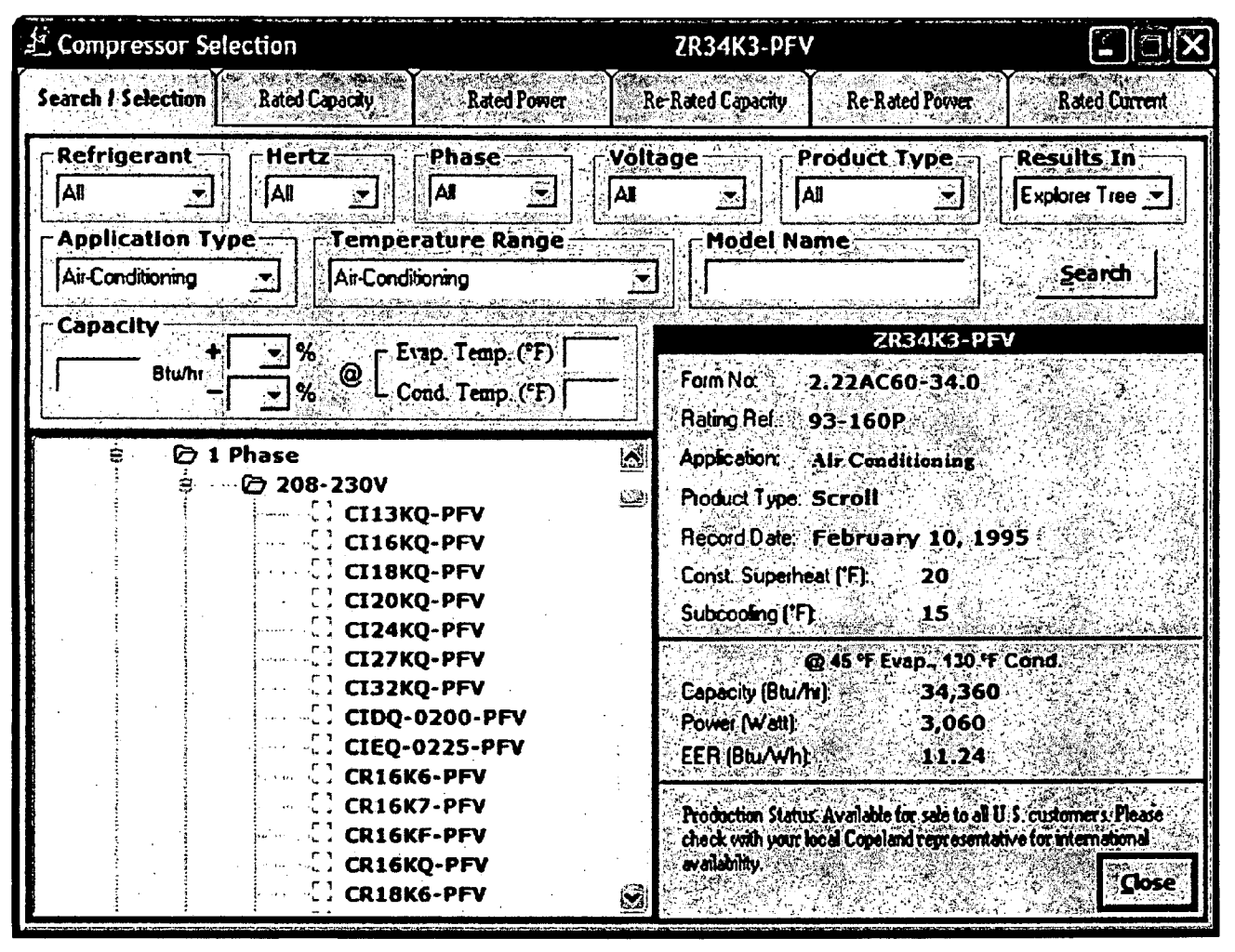

Referring now to FIG. 16, the user can access a database of manufacturer's compressors (both air-conditioning and refrigeration compressors models). The user can search and view the details of all available compressors. The compressor details include compressor type (e.g., semi-hermetic, hermetic, scroll, etc.), application type (e.g., refrigeration and air-conditioning), temperature range (e.g., air-conditioning, medium temp. high temp., etc.), voltage, frequency, capacity, power, amps, compressor operating envelope and re-rating of compressor performance to a user specified condition. The compressor selection screen is accessed either by choosing Inputs from the toolbar and Compressor menu or by clicking on the compressor image in the main screen.

Figure 17:
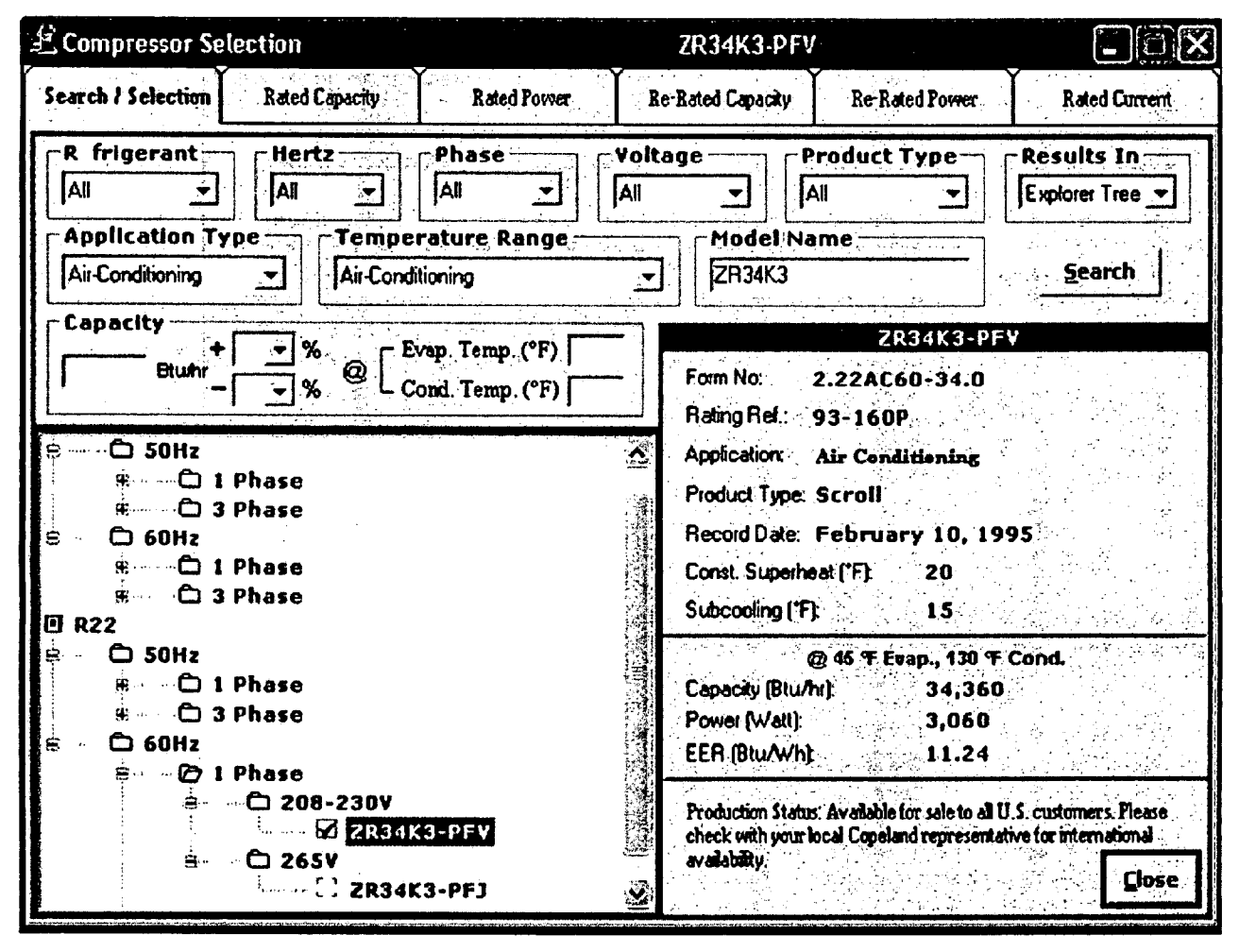
Figure 18:
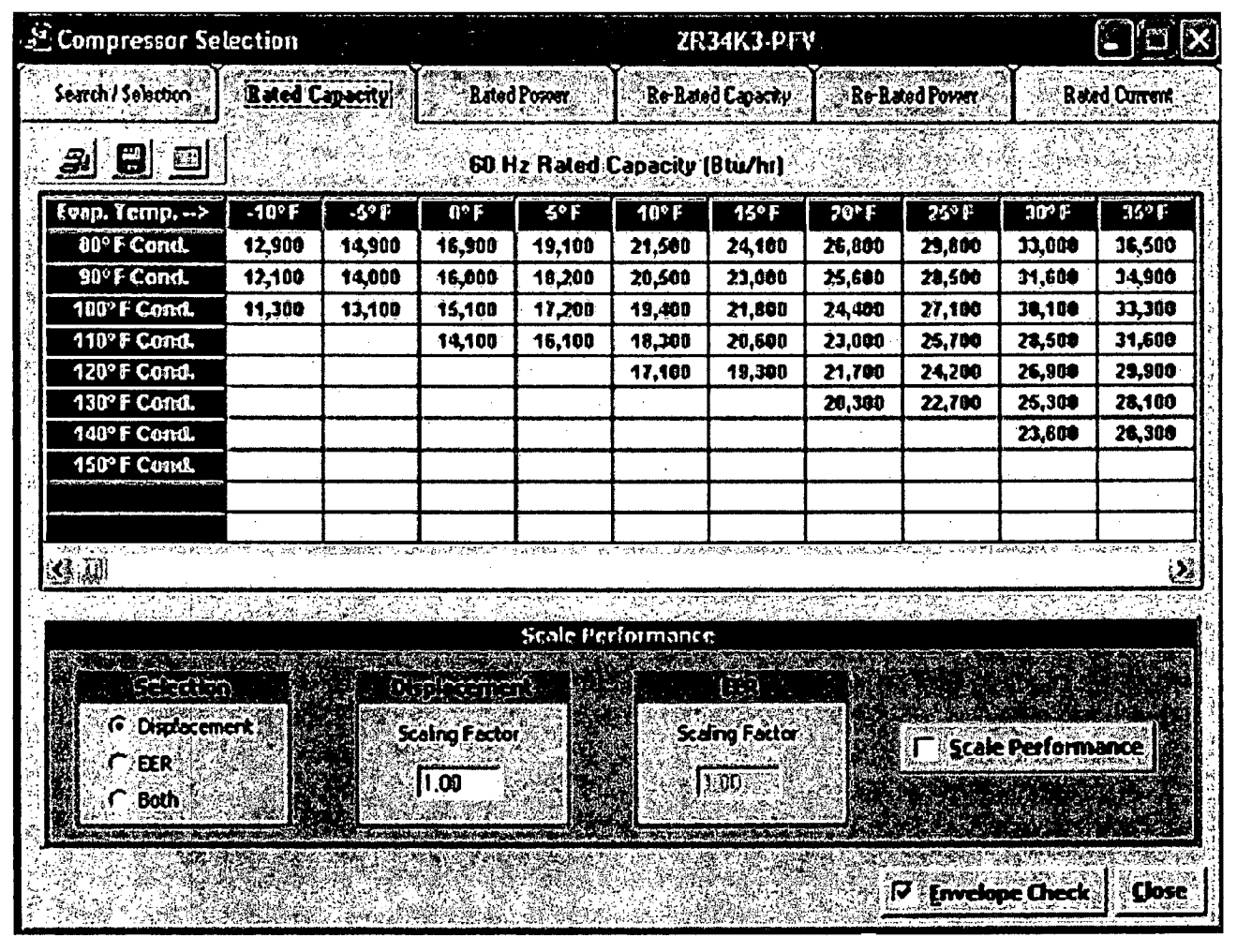
Figure 19:
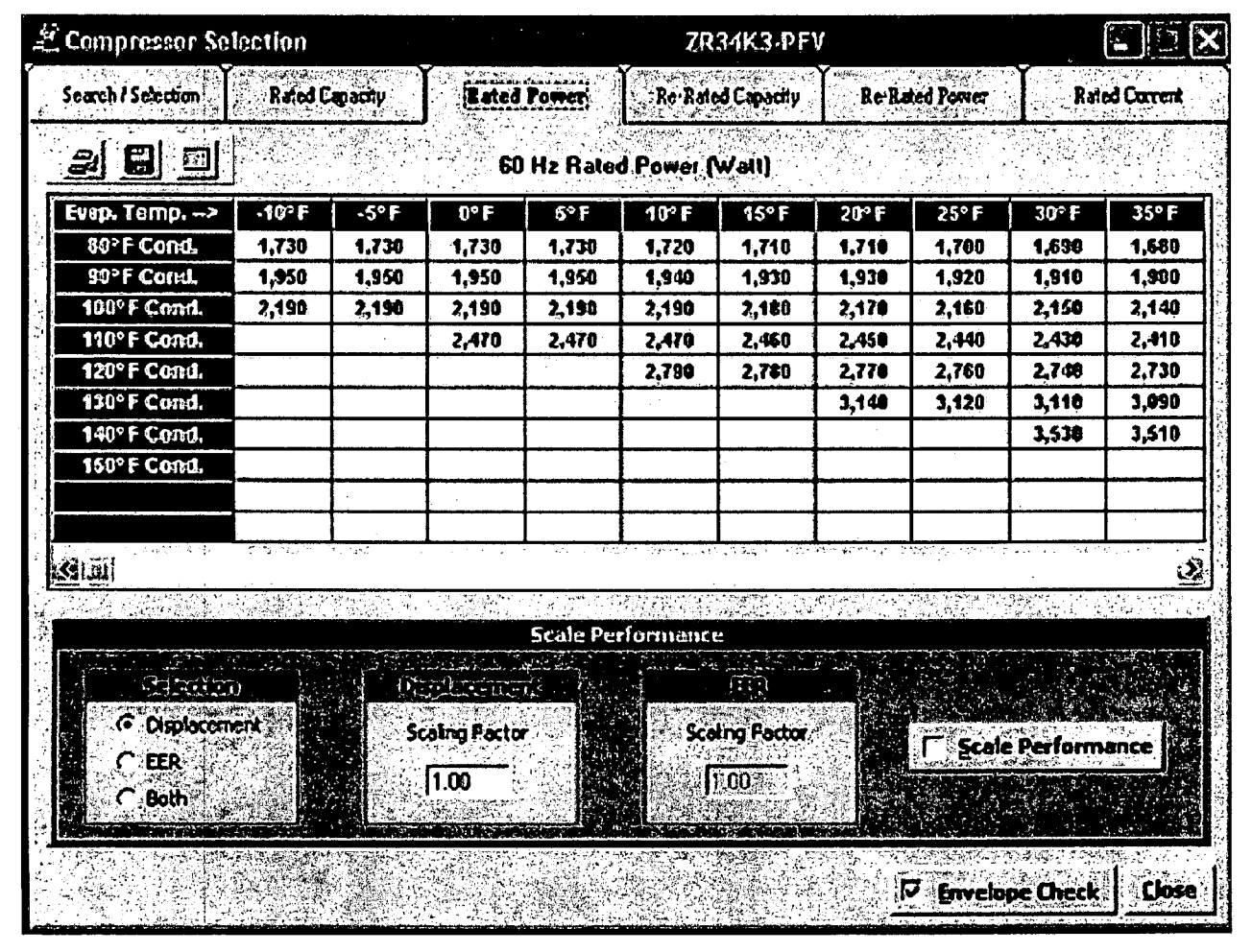

Referring now to FIG. 17, the compressor database can be searched by entering a known compressor model in the Model Name field and clicking the Search button. The model name can be complete or partial. For example, if the user enters the model name as ZR34K3-PFV and Refrigerant R-22, the search is very specific and only the ZR34K3-PFV compressor will show up in the search result. However, if the user enters the model name as ZR, all the models starting with ZR will appear in the compressor result list. The search settings and the results include compressor model (e.g., ZR34K3), voltage, phase and frequency, application (e.g., air-conditioning), product type (e.g., scroll), capacity, power and energy efficiency ratio (EER) at a specified rating point (e.g., 45° F. Evaporator, 130° F. Condenser), record date and tested condition (e.g., return gas temperature/superheat and subcooling). Capacity, power and current (amp) data over the entire operating range of the compressor are shown in the Rated Capacity, Rated Power and Current tabs, FIGS. 18 and 19, respectively, once a compressor model is selected from the generated compressor list.

Figure 20:
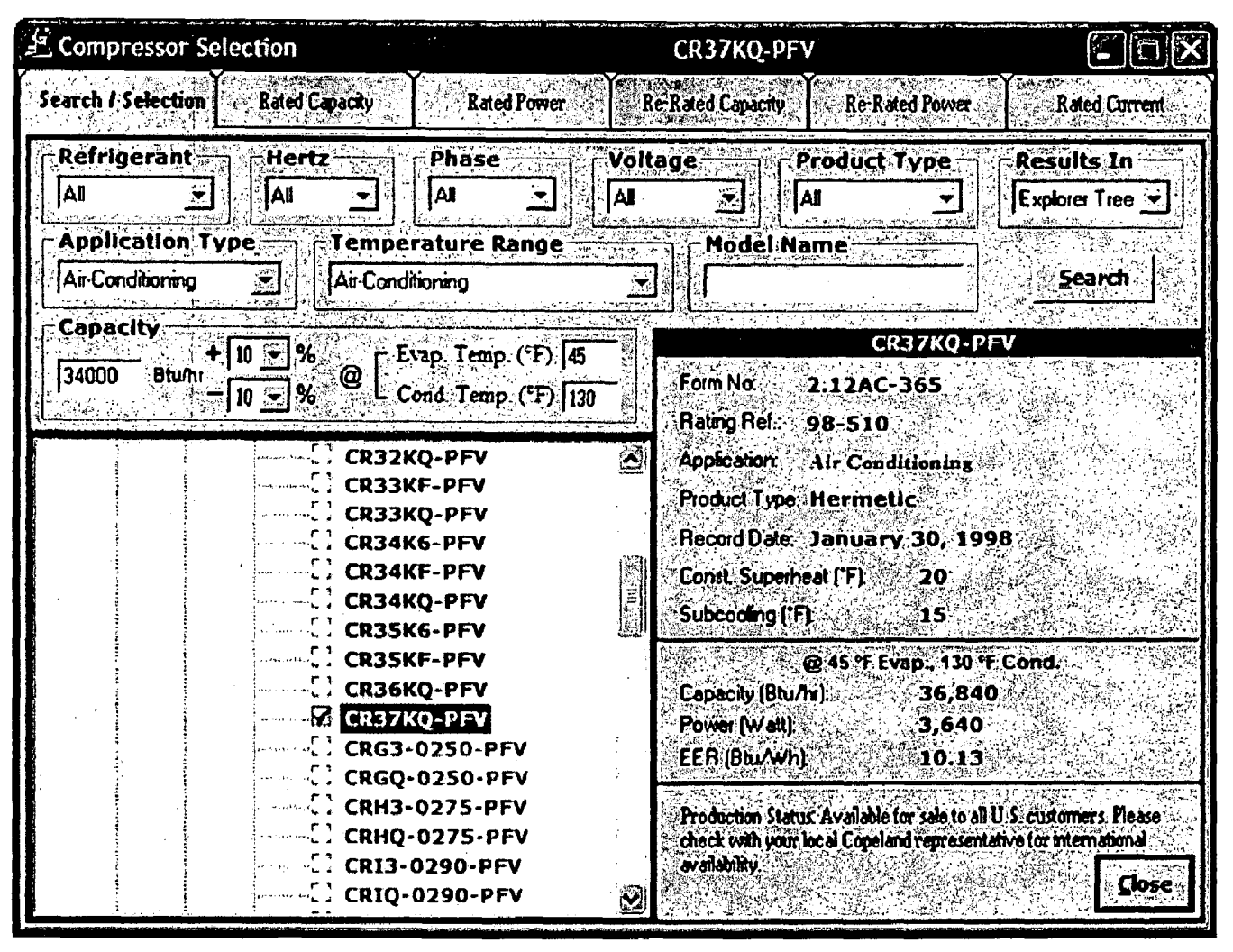

Referring now to FIG. 20, the user can search the compressor database based on a specified capacity range. The user enters a capacity and specifies a capacity tolerance (±5% to ±50%), refrigerant, application and product type and clicks on the Search button. For example, if the user enters the capacity as 34,000 Btu/hr with a capacity tolerance of −10% to +10%, 45° F. evaporator temperature, 130° F. condensing temperature, application type as air-conditioning, product type as scroll and refrigerant as R-22 the search lists several corresponding compressor models. Capacity, power and current information are displayed when the user selects a particular compressor model from the compressor list. Compressor models that are obsolete are highlighted.

Referring now to FIG. 21, the user is also able to scale compressor displacement, Energy Efficiency Ratio (EER) or both compressor displacement and EER. With respect to displacement, scaling is provided for 50 Hz and 60 Hz. For example, if the user starts with the 60 Hz compressor capacity and power data, 50 Hz performance data is derived by applying the ratio of 0.83 to the displacement of the given compressor. This feature may be accessed by selecting the Rated Capacity or Rated Power tabs, checking the Scale Performance option and the Displacement option in the Selection box. The user inputs a scaling factor in the Displacement section. Removing the check mark from the Scale Performance box resets the data to its original state.

EER scaling enables the user to alter the power of the compressor without changing the capacity. EER scaling is accessed by opening the Rated Capacity or Rated Power tabs, checking the Scale Performance box and selecting the EER option in the Selection box. The user inputs the scaling factor in the EER box. Removing the check mark from Scale Performance box resets the data to its original state.

Scaling both displacement and EER enables the user to simultaneously scale both the capacity and the power of the compressor. Scaling both displacement and EER is accessed by opening the Rated Capacity or Rated Power tabs, checking the Scale Performance box and selecting Both in the Selection box. The user inputs scaling factors for both Displacement and EER in their respective boxes. Removing the check mark from Scale Performance box resets the data to its original state.

Figure 22:
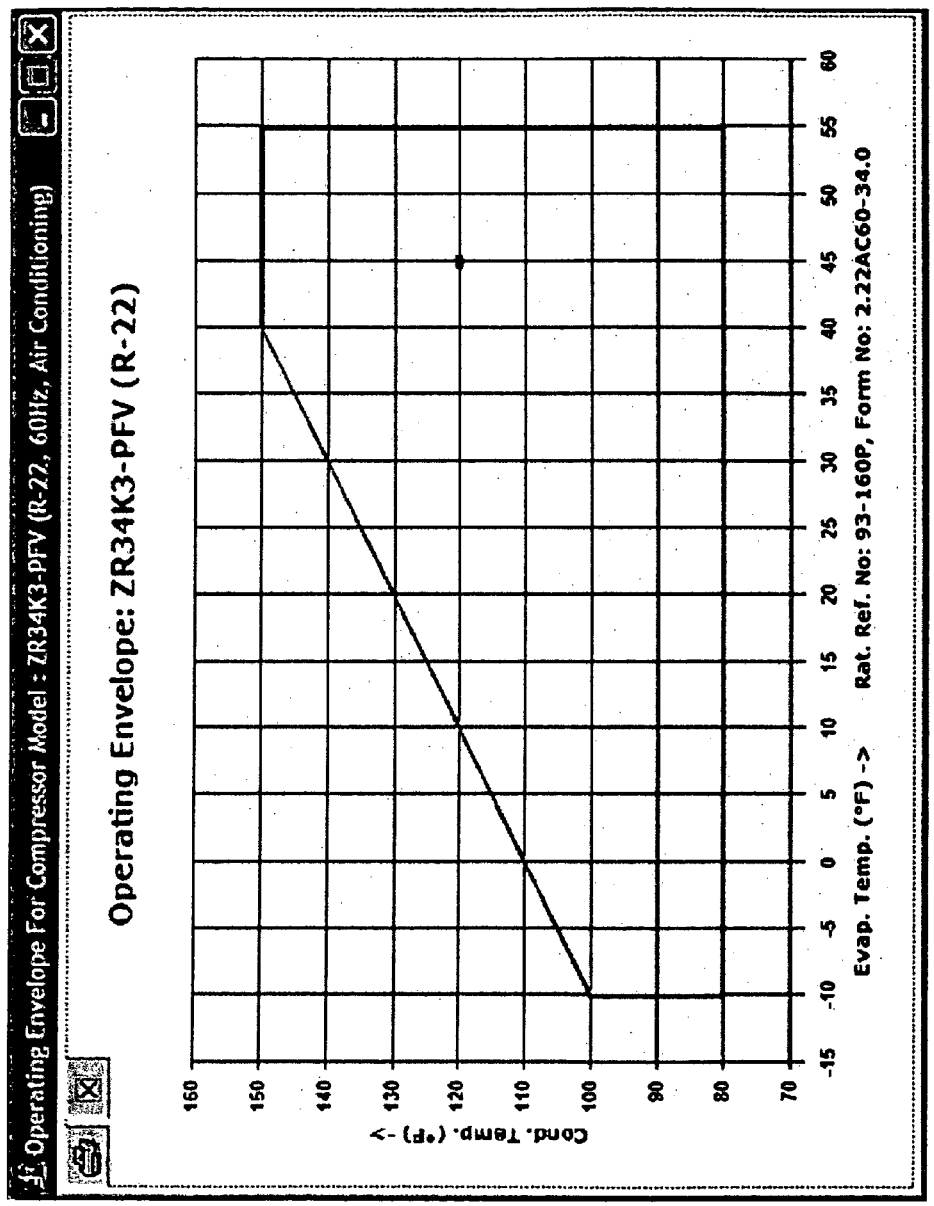
FIG. 22 is a screen-shot illustrating a compressor operating envelope.

Referring now to FIG. 22, the user can perform a compressor envelope check on the capacity, power and current (amp) data. This procedure automatically deletes any performance data that falls outside the boundaries of the compressor operating envelope. The operating envelope check is activated by choosing the Apply Envelope Check button in the Rated Capacity, Rated Power or Rated Current tabs. This feature may also be accessed by choosing the Operating Envelope icon located in the top left hand corner of the Rated Capacity, Rated Power and Rated Current tabs. A graphical view of the operating envelope of the selected compressor is provided. FIG. 22 illustrates an exemplary compressor operating envelope with the user selected operating condition of 45° F./120° F. (evaporator temperature/condenser temperature) marked with a dot.

Figure 23:
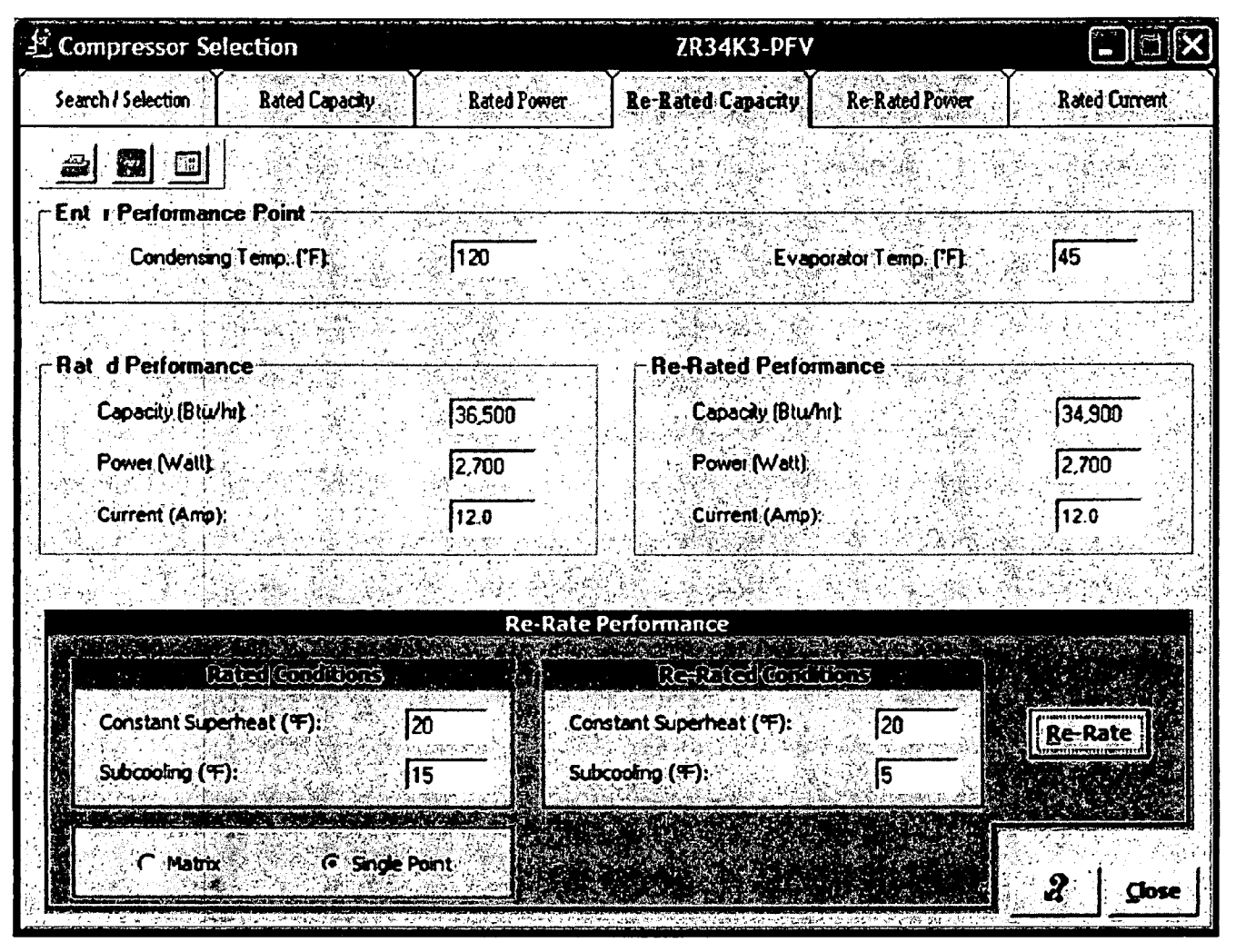

Referring now to FIG. 23, the compressor performance data shown in the Rated Capacity, Rated Power, Rated Current tabs are the performance at the compressors rated condition. The user can re-rate the compressor performance data at a condition other than the rated condition. Compressor re-rating can be performed over the entire operating range or on a single operating point (i.e. at a user specified condensing and evaporator temperature) of the compressor. The user is notified if an operating point outside the compressor operating envelope is entered.

To re-rate performance for the entire operating range the user selects the Re-Rated Capacity or Re-Rated Power tabs and selects the Matrix option. The user enters new operating conditions in the Re-Rated Conditions section, including return gas temperature, constant superheat and sub-cooling temperatures. The user may also check the re-rated conditions against the compressor operating envelope by selecting the Re-Rate With Envelope Check box. The user presses the Re-Rate button to view the re-rated performance.

The cooling system design simulator also simulates the system design based on tubing and line heat transfer data. The tubing and line heat transfer data is entered by opening the Connecting Tubing and Line Heat Transfer screen. The user accesses this screen either by choosing Inputs from the toolbar and the Tubing and Line Heat Transfer menu or by clicking on the tubing and line images on the main screen.

Referring now to FIGS. 24 and 25, the tubing and line heat transfer data requires several inputs. The inputs required are operation mode dependent. In other words, the inputs vary between heating and cooling modes. The required inputs are grouped in categories that include inside tubing diameter, equivalent tubing lengths and shell heat loss rate factor and line heat transfer.

In the cooling mode (FIG. 24), the inside tubing diameter group includes liquid line, vapor line from evaporator to compressor and discharge line from compressor to condenser. The equivalent tubing length group includes liquid line, vapor line from evaporator to compressor and discharge line from compressor to condenser. The shell loss and heat transfer group includes compressor shell heat loss rate factor, heat loss rate in compressor discharge line, heat gain in compressor suction line and heat loss rate in liquid line. The compressor shell heat loss rate is defined as the fraction of the compressor power input into the system.

In the heating mode (FIG. 25), the inside tubing diameter group includes liquid line, vapor line from reversing valve to condenser, vapor line from reversing valve to evaporator, suction line from reversing valve to compressor and discharge line from compressor to reversing valve. The equivalent tubing length group includes liquid line, vapor line from reversing valve to condenser, vapor line from reversing valve to evaporator, suction line from reversing valve to compressor and discharge line from compressor to reversing valve. The shell loss and heat transfer group includes compressor shell heat loss rate factor, heat loss rate in compressor discharge line, heat gain in compressor suction line and heat loss rate in liquid line.

Figure 26:
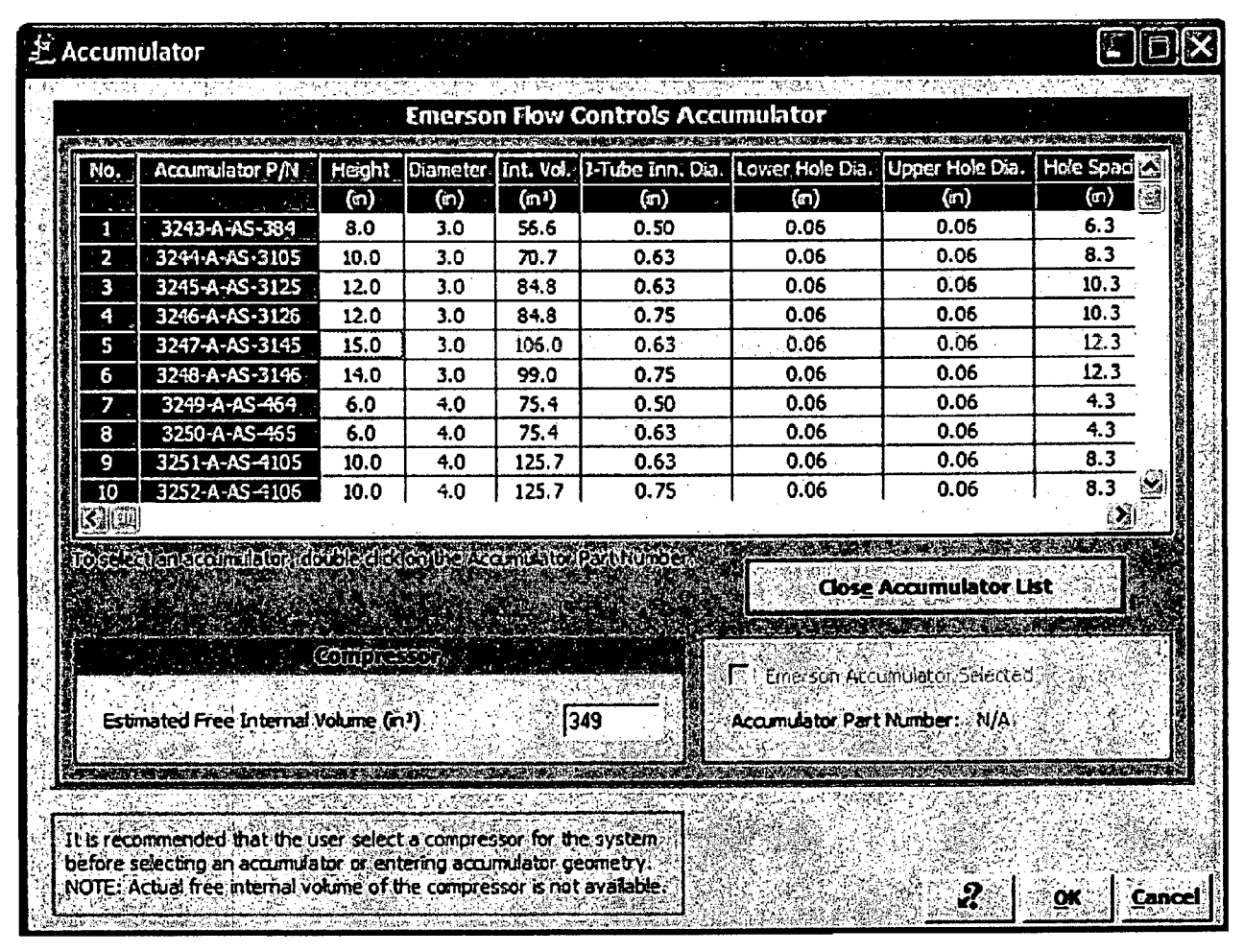
Figure 27:
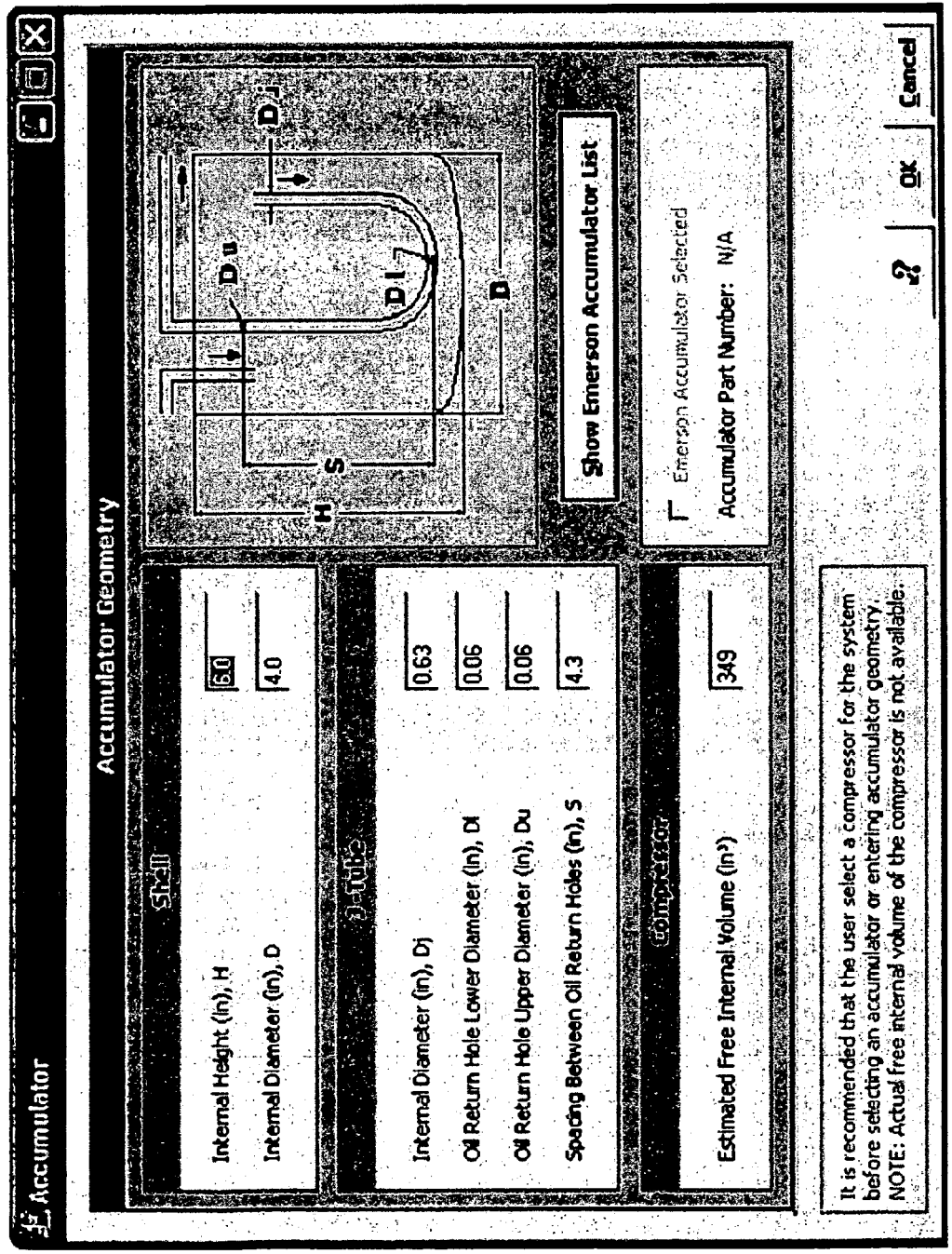
FIG. 27 is a screen-shot illustrating accumulator geometry inputs.
Figure 28:
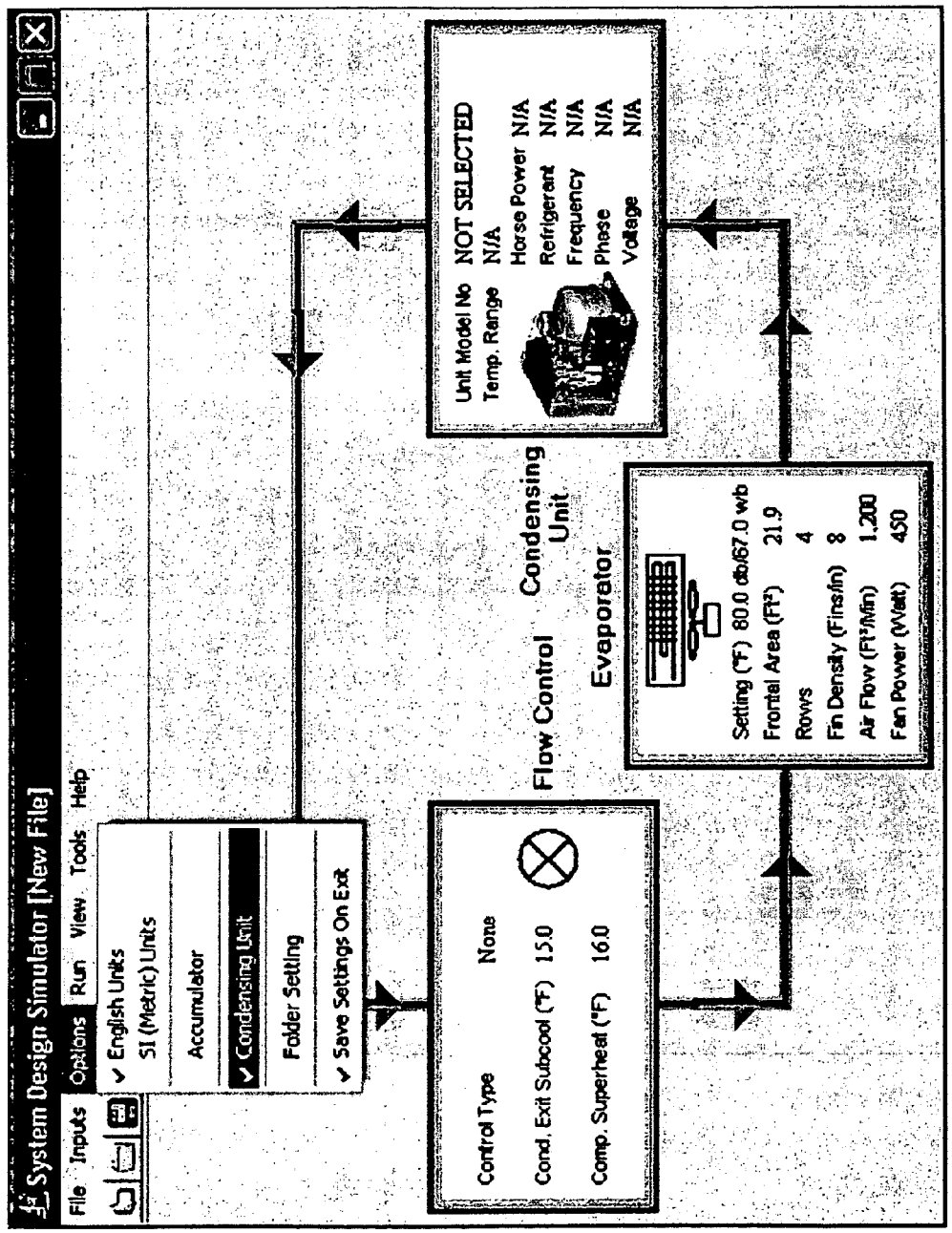
FIG. 28 is a screen-shot illustrating air-cooled condensing unit (ACU) selection.
Figure 32:
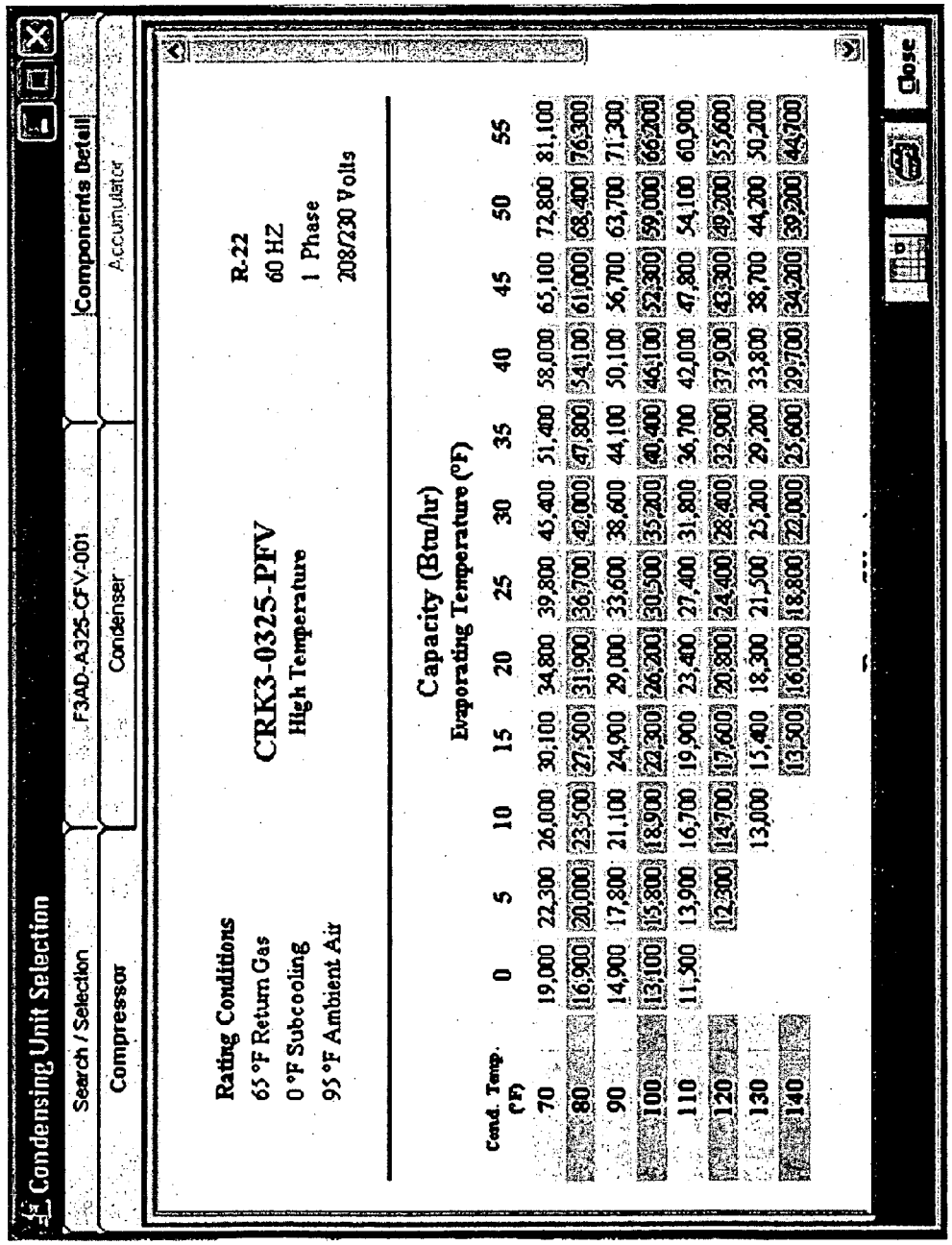
FIG. 32 is a screen-shot illustrating ACU compressor capacity based on evaporator temperature and condensing temperature.
Figure 33:
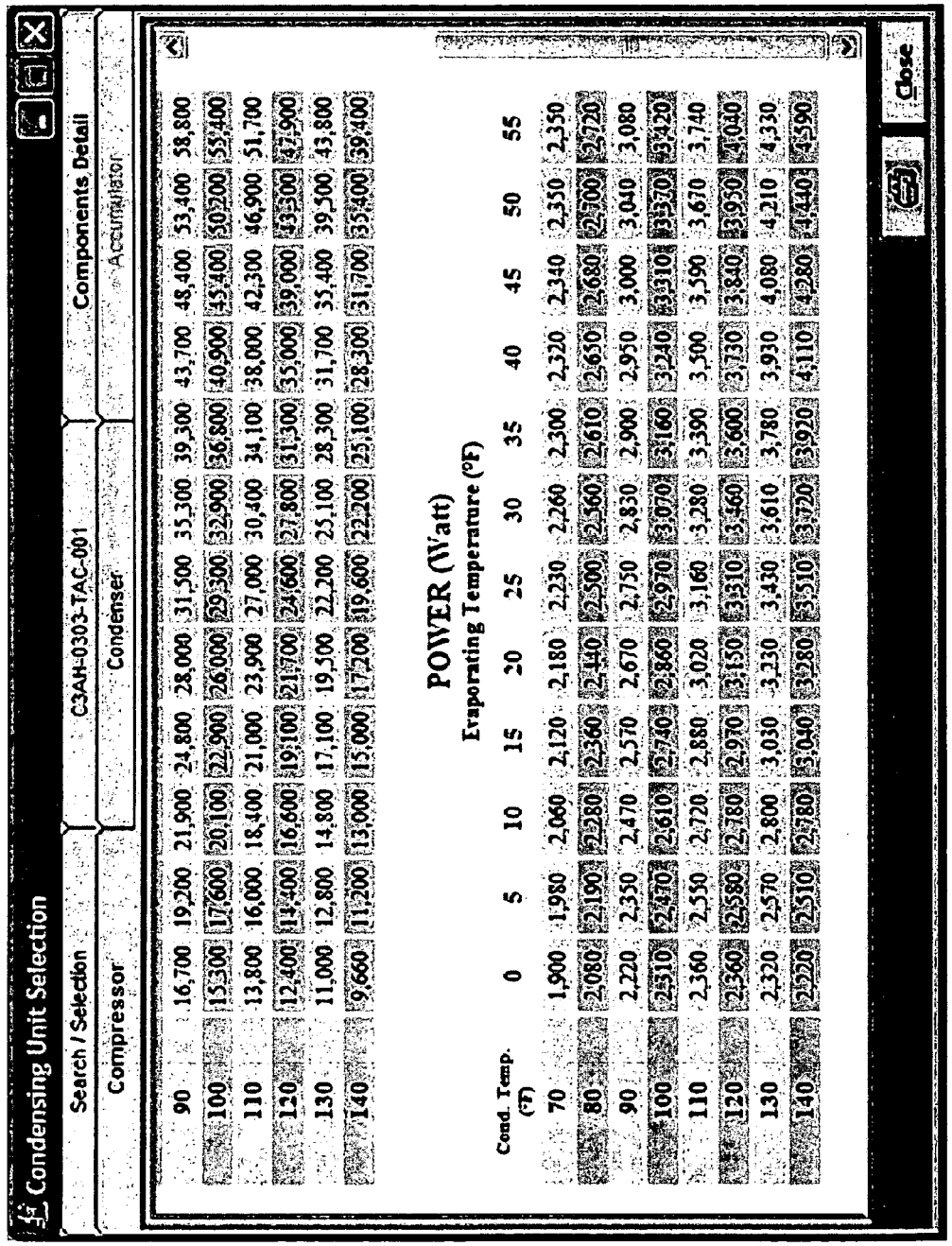
FIG. 33 is a screen-shot illustrating ACU compressor power based on evaporator temperature and condensing temperature.

Referring now to FIGS. 26 and 27, the user can add an accumulator to the cooling system simulation. To add an accumulator, the user selects the Accumulator under the Options menu in the main screen. An Accumulator image appears in the main screen between the evaporator and the compressor. To remove the accumulator, unselect the Accumulator under the Options menu.

The user can input the accumulator configuration parameters including shell, J-tube and compressor. The shell parameters include internal height and internal diameter. The J-tube parameters include internal diameter, oil return hole lower diameter, oil return hole upper diameter and spacing between oil return holes. The compressor parameters include estimated free internal volume.

The user can select an accumulator from an accumulator database, which automatically inputs the configuration parameters. By clicking on the Show Accumulator List button, the user is able to browse the database of available accumulators. The database is initially ordered by part number (P/N) field. The user can re-order the list by clicking the desired parameter on the top row (header row). An accumulator is selected from the list by double clicking on the desired accumulator P/N.

Referring now to FIGS. 28 to 34, the system design simulator enables the user to design a system including an air-cooled condensing unit (ACU). The user can include an ACU by clicking on Condensing Unit under the Options menu in the main screen. The cooling system graphic is altered to illustrate the ACU (i.e., combined compressor and condenser).

With particular reference to FIG. 29, the user can select an available ACU from an ACU database. A search tool is provided so that the user can quickly search and view the details of the available ACU's that meet the design need. The ACU selection screen shows a variety of search criteria available for finding the proper ACU. The search criteria can be a single or a combination of parameters. The search criteria include refrigerant type, temperature range, frequency, phase, voltage, ranges of physical dimensions (i.e., length, width, height), nominal horsepower (Hp) or capacity.

The search is initiated by choosing the Search button and the result yields a list of ACU's matching the user specified criteria. An ACU is selected by double clicking the model. The Component Details tab provides pertinent information about the selected ACU. The Compressor tab under Components Detail shows the compressor performance (capacity and power) (see FIGS. 32 and 33). The Condenser tab illustrates condenser geometry and the Accumulator tab provides accumulator geometry (see FIG. 34). Accumulator details are provided only if the particular ACU is equipped with an accumulator. The Condenser tab enables the user to enter inputs for the entering air condition. The user can view a reference drawing of the ACU illustrating the component layout. As illustrated in FIG. 31, the user can view the details of the selected ACU by clicking on the ACU tab (e.g. C3AH-0303-TAC-001).

Figure 35:
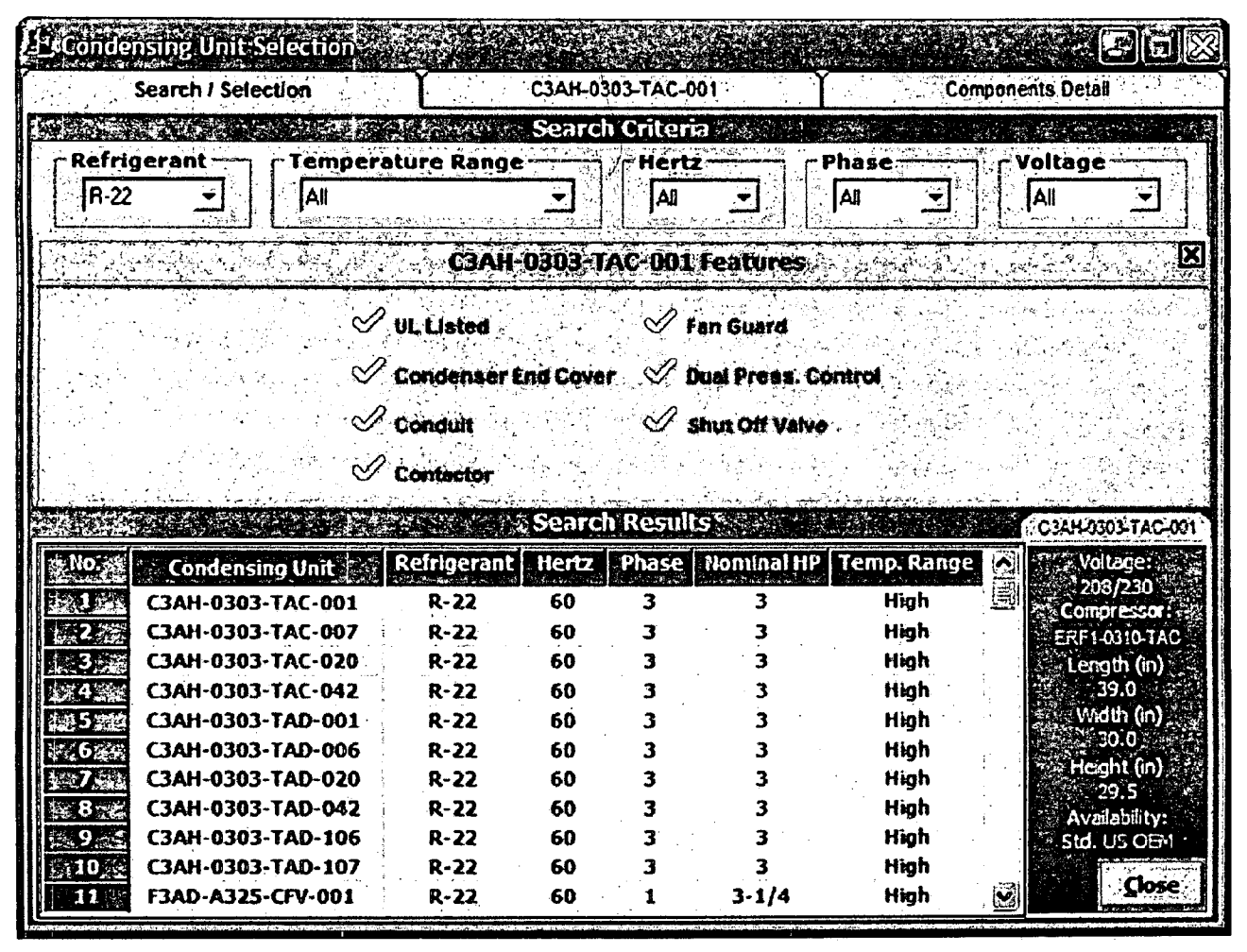
Figure 36:
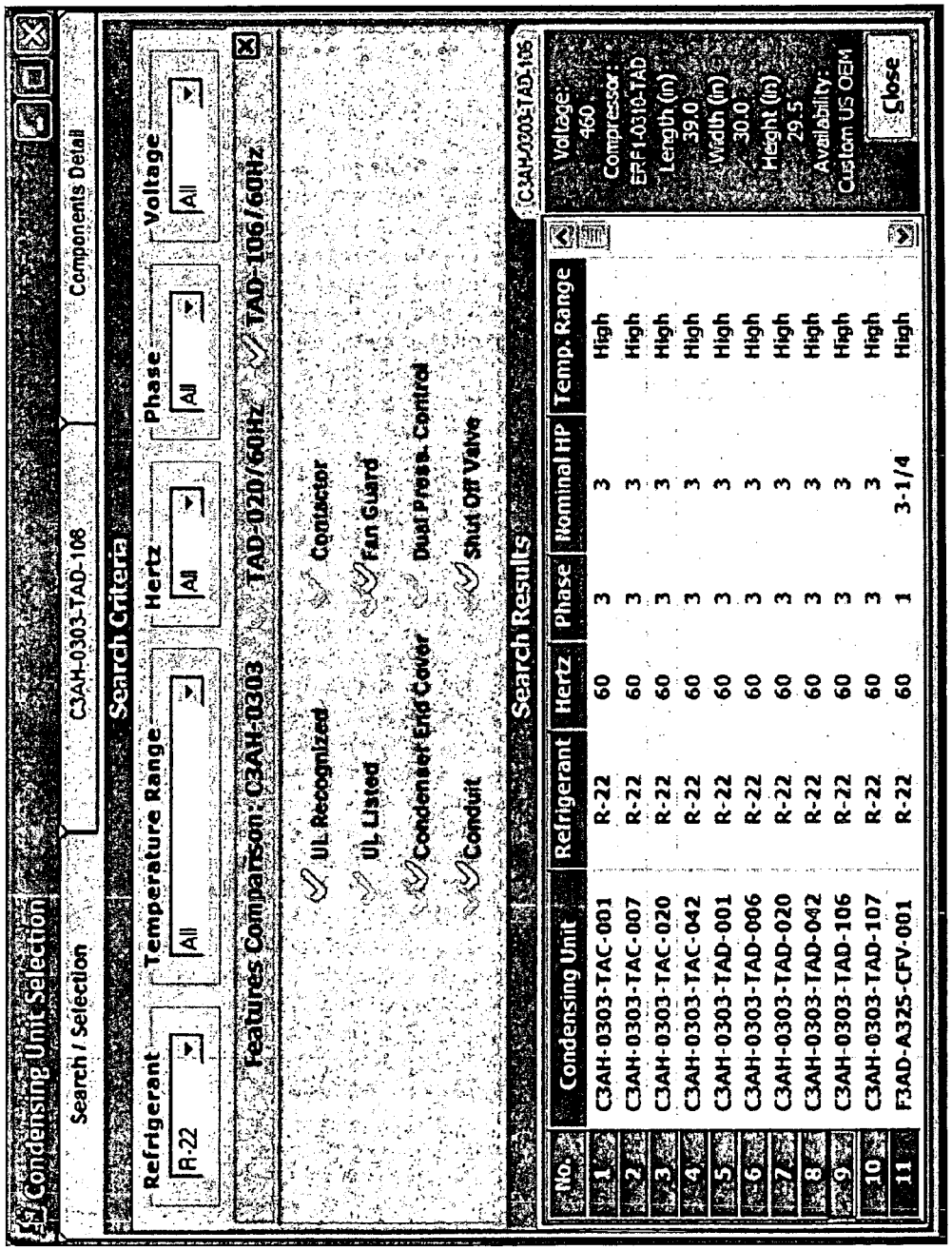
FIG. 36 is a screen-shot illustrating a key feature comparison between ACUs.

Referring now to FIGS. 35 and 36, the system design simulator identifies the key features of the selected ACU. The key features can include shut-off valves, receiver, accumulator, pressure controls and the like. The key features do not impact the ACU's thermal performance but are provided to enhance the ACU's functionality. The user can view the ACU's key features by moving the mouse over the lower half of the screen. The check mark against shows the key items included in the feature list for the selected ACU. The key features available may vary with the ACU model line. However, the thermal performance of both units is same as long as the first nine characters of the model and the operating frequency of the units are same. As illustrated in FIG. 36, the user can compare key features of multiple ACU's.

Figure 37:
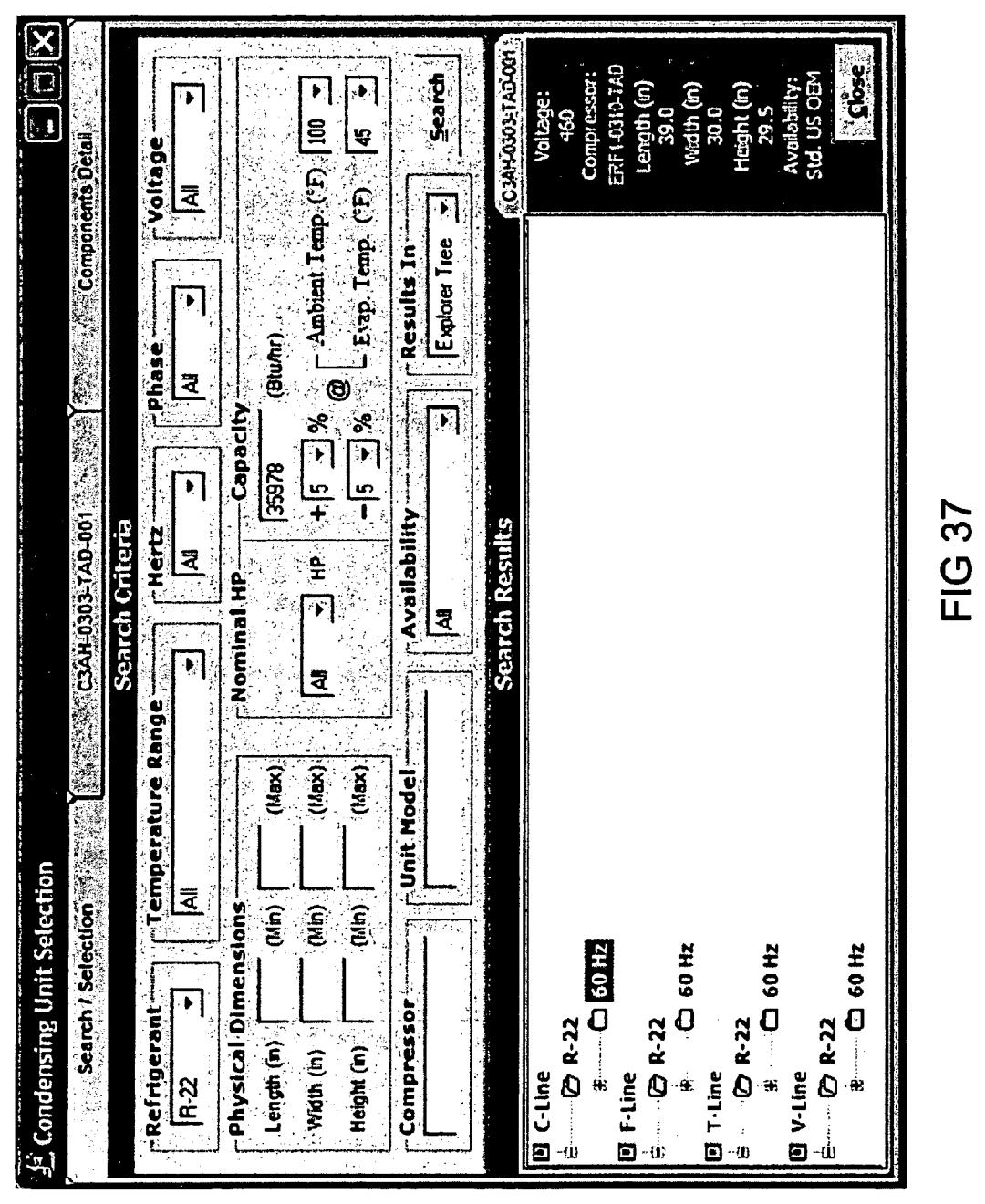

Referring now to FIG. 37, the ACU search results can be displayed either in an explorer tree by selecting Explorer Tree in the Results In field or in a Spread Sheet format (see FIG. 29) by selecting Spread Sheet. The user selected format preference for display will remain in-force until the user changes the display format. It should be noted, however, that the search criteria for both formats are identical. The ACU model ACU line (C, F, etc), unit's electrical, capacity (Hp) are color coded to assist user navigation.

Figure 38:
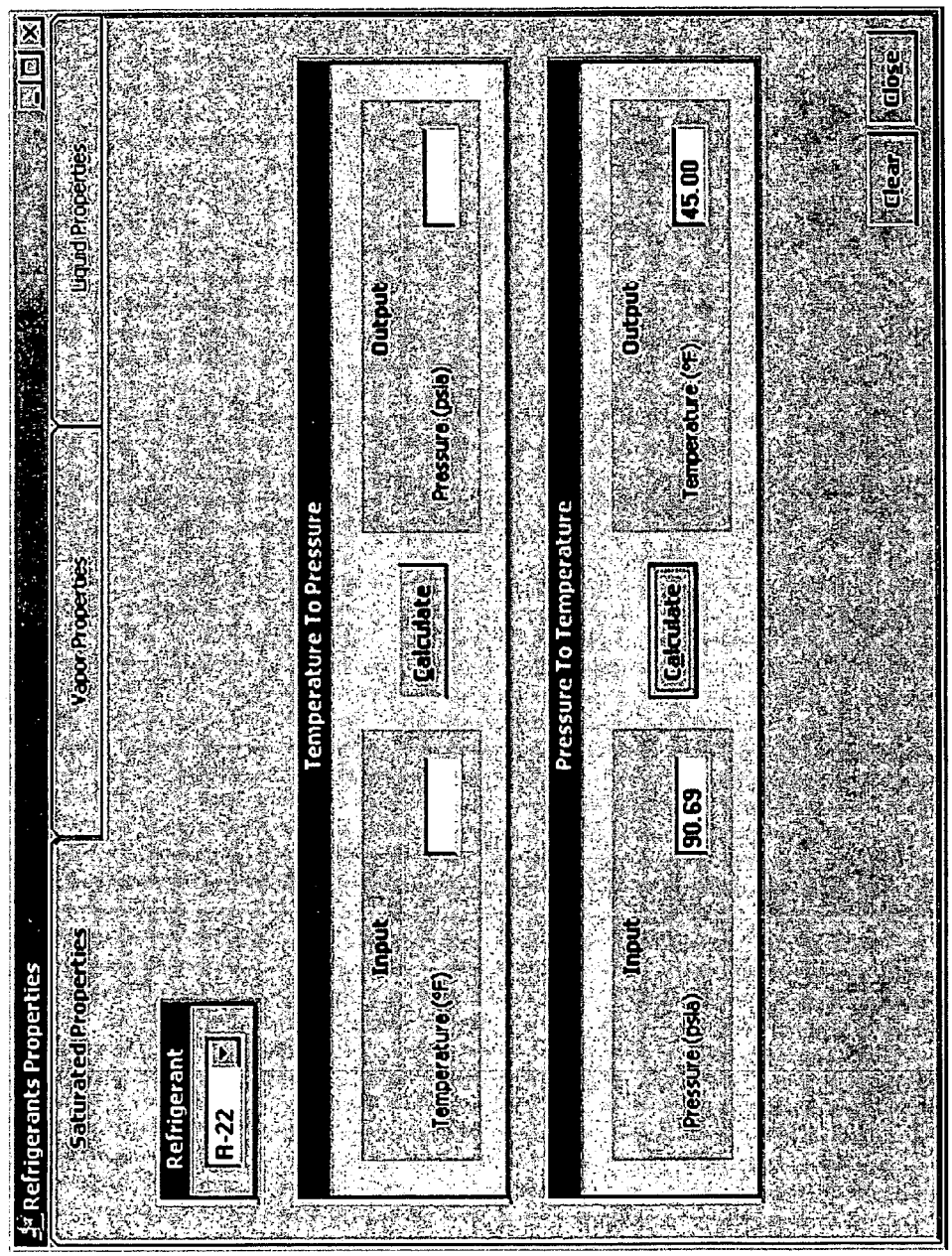
FIG. 38 is a screen-shot illustrating refrigerant saturated properties inputs.
Figure 39:
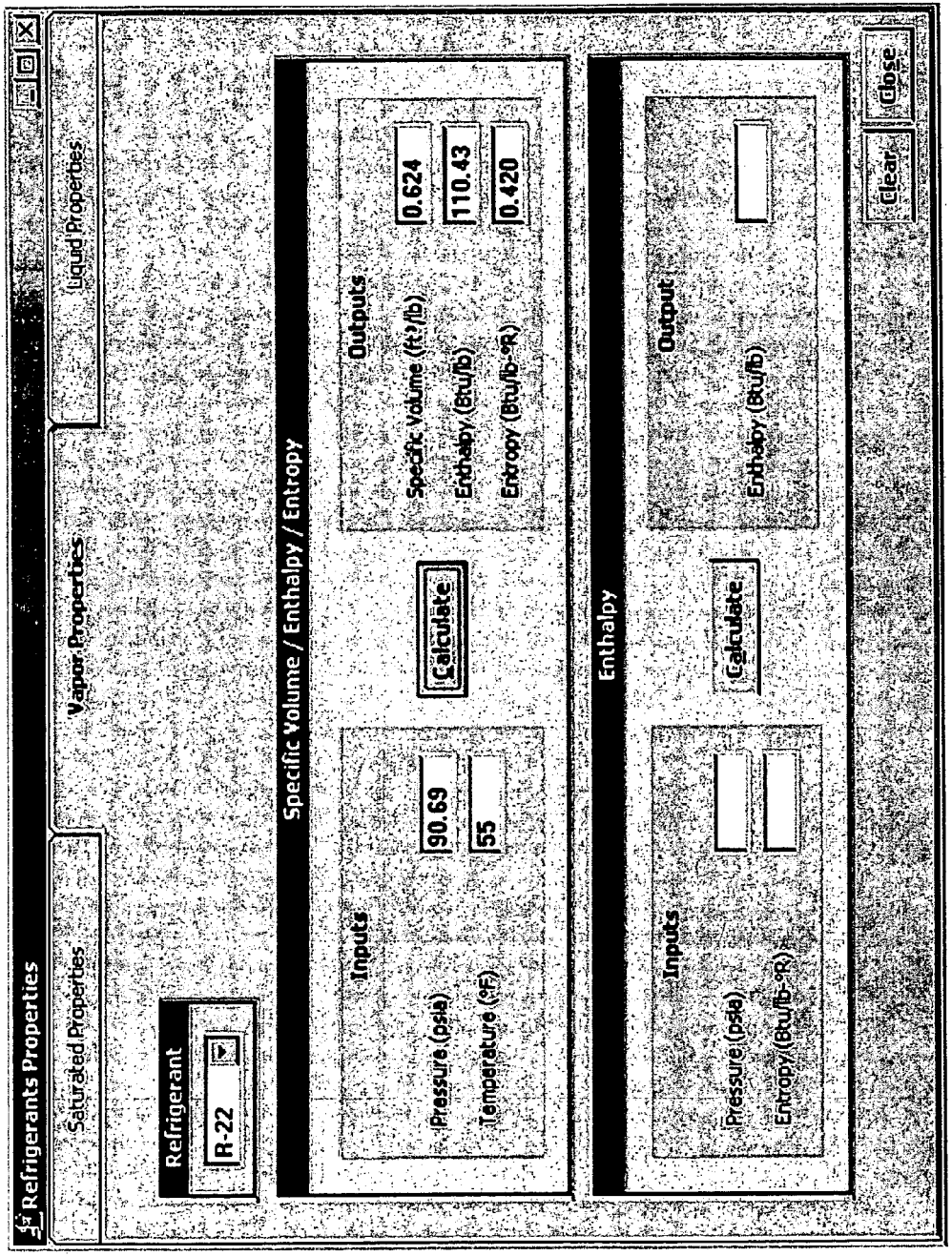
FIG. 39 is a screen-shot illustrating refrigerant superheated properties inputs.
Figure 40:
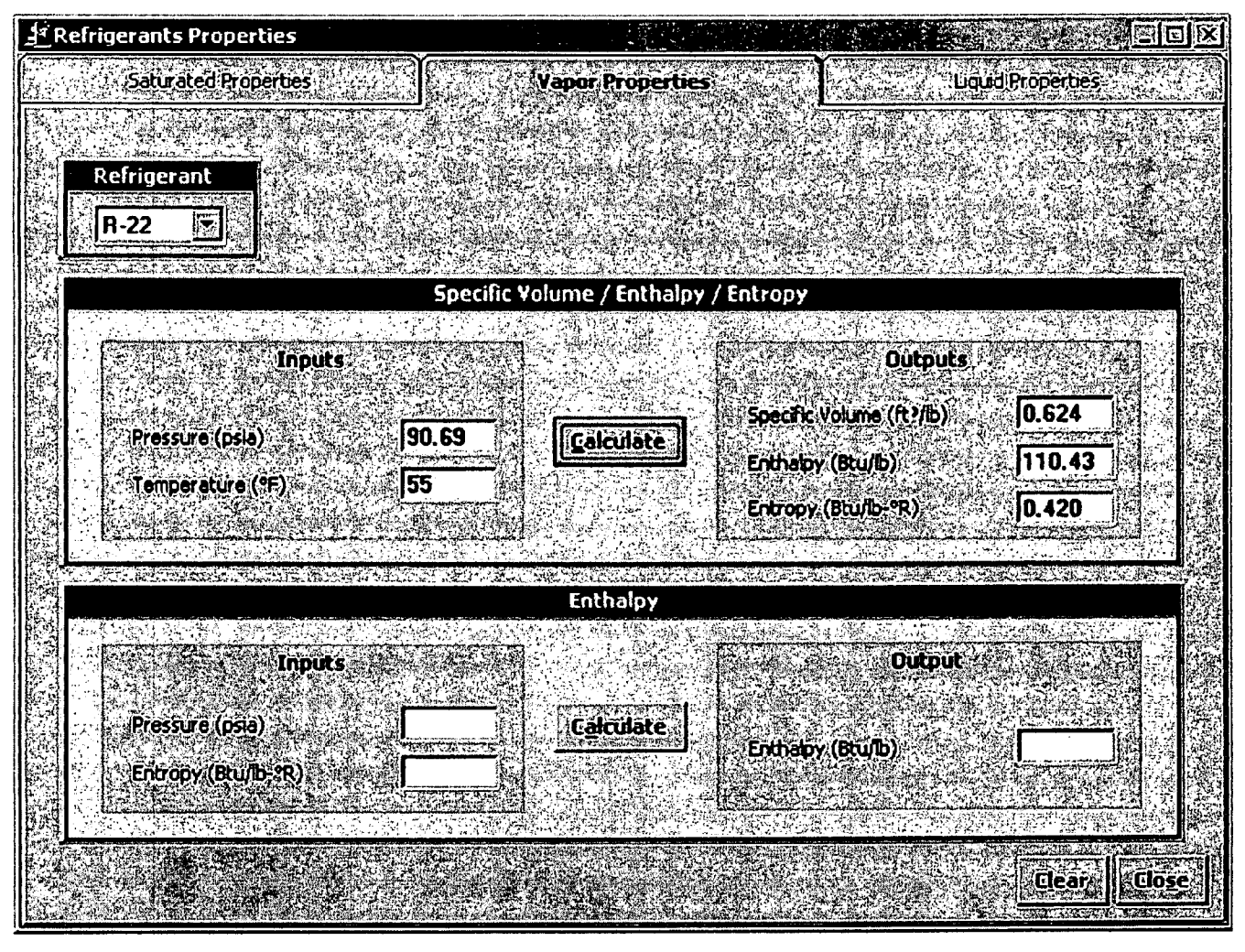

Referring now to FIGS. 38 through 40, the system design simulator provides the thermodynamic properties of refrigerants including saturated properties, superheated properties and liquid properties. The refrigerants include, but are not limited to, R-12, R-22, R-502, R-134a, R-404A, R-507 and R-410A. The saturation pressure can be determined based on temperature by choosing the Saturated Tab and entering the temperature (see FIG. 38). The corresponding saturation pressure is given by clicking on the Calculate button. The saturation temperature can similarly be determined based on pressure.

The vapor properties can be determined by clicking on the Vapor Properties tab and inputting pressure and temperature (see FIG. 39). The properties including specific volume, enthalpy and entropy are provided by clicking on the Calculate button. The enthalpy can be determined based on the pressure and entropy by clicking on the corresponding Calculate button. The liquid properties are determined by clicking on the Liquid Properties tab and inputting temperature (see FIG. 40). The properties including density, specific volume, enthalpy and latent heat vapor are provided by clicking on the Calculate button.

Figure 42:
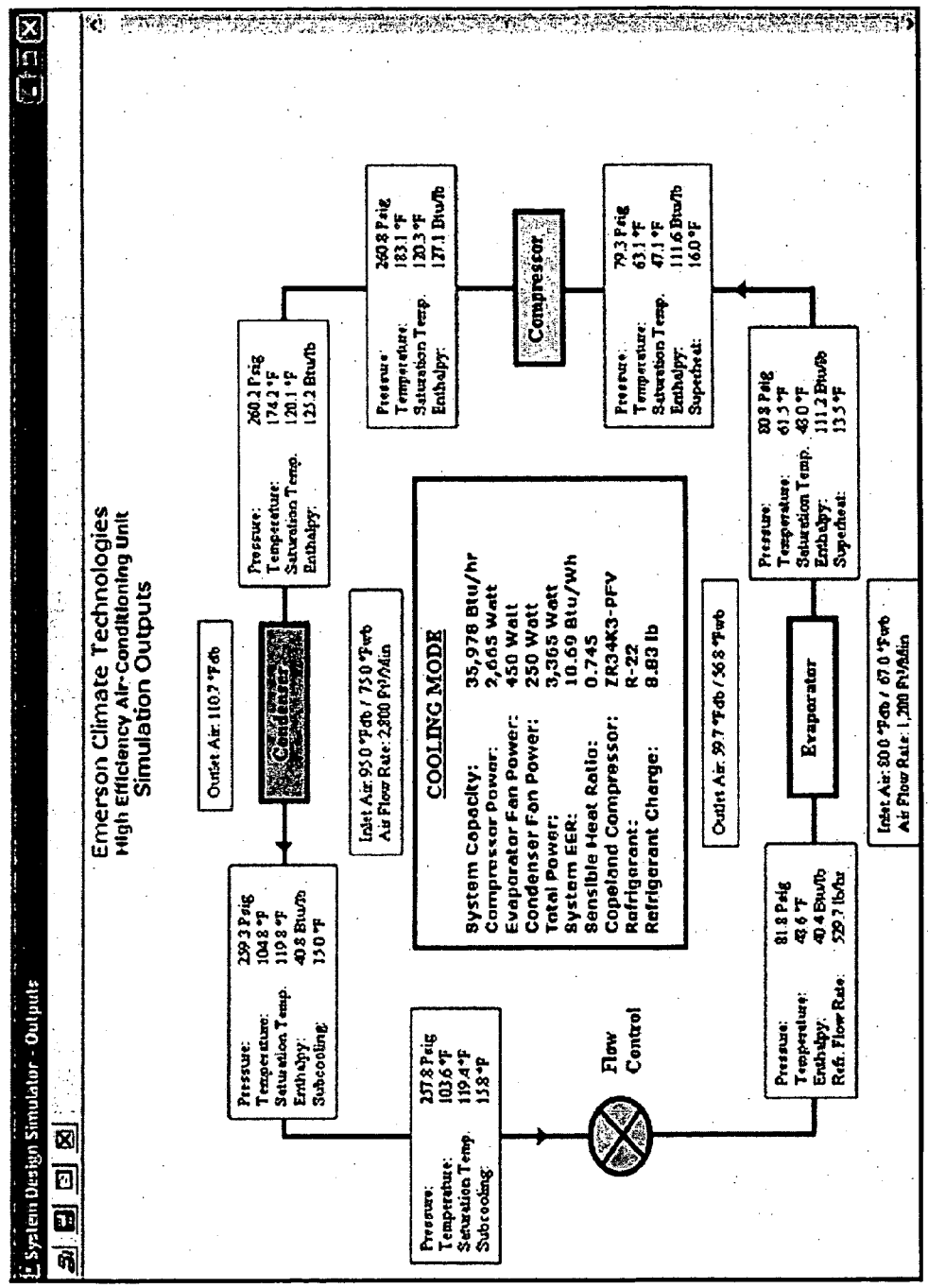
FIG. 42 is a screen-shot illustrating simulation results in graphical format.

Referring now to FIGS. 41 and 42, after having configured the cooling system, the design simulator is run by choosing the Run option on the menu bar and clicking Run Model. The design simulator can also be run by clicking the Run icon on the toolbar. The results are provided in tabular and graphical formats. More particularly, a summary table is provided, listing the key system inputs and the parameters for the individual components (see FIG. 41). Alternatively, a graphical illustration of the cooling system is shown with the corresponding parameters listed adjacent to images of the individual components (see FIG. 42). The results can be printed by choosing the File menu, Print and Outputs options from the main screen or by clicking on the Print icon. Additionally, the results can be saved to an electronic file by choosing the File menu, Save option or by clicking on the Save icon.

The overall system parameters include mode, system capacity, compressor power, evaporator fan power, condenser fan power, total power, system EER, sensible heat ratio, compressor model number, refrigerant and refrigerant charge. The condenser air flow parameters include inlet air temperature, air flow rate and outlet air temperature. The condenser inlet refrigerant parameters include pressure, temperature, saturation temperature and enthalpy. The condenser outlet refrigerant properties include pressure temperature, saturation temperature and sub-cooling temperature. The flow control inlet refrigerant properties include pressure, temperature, saturation temperature and sub-cooling temperature.

The evaporator air flow properties include inlet air temperature, air flow rate and outlet air temperature. The evaporator inlet refrigerant parameters include pressure, temperature, enthalpy and refrigerant flow rate. The evaporator outlet refrigerant parameters include pressure, temperature, saturation temperature, enthalpy and superheat temperature. The compressor suction refrigerant parameters include pressure, temperature, saturation temperature, enthalpy and superheat temperature. The compressor discharge refrigerant properties include pressure, temperature, saturation temperature and enthalpy.

Figure 43:
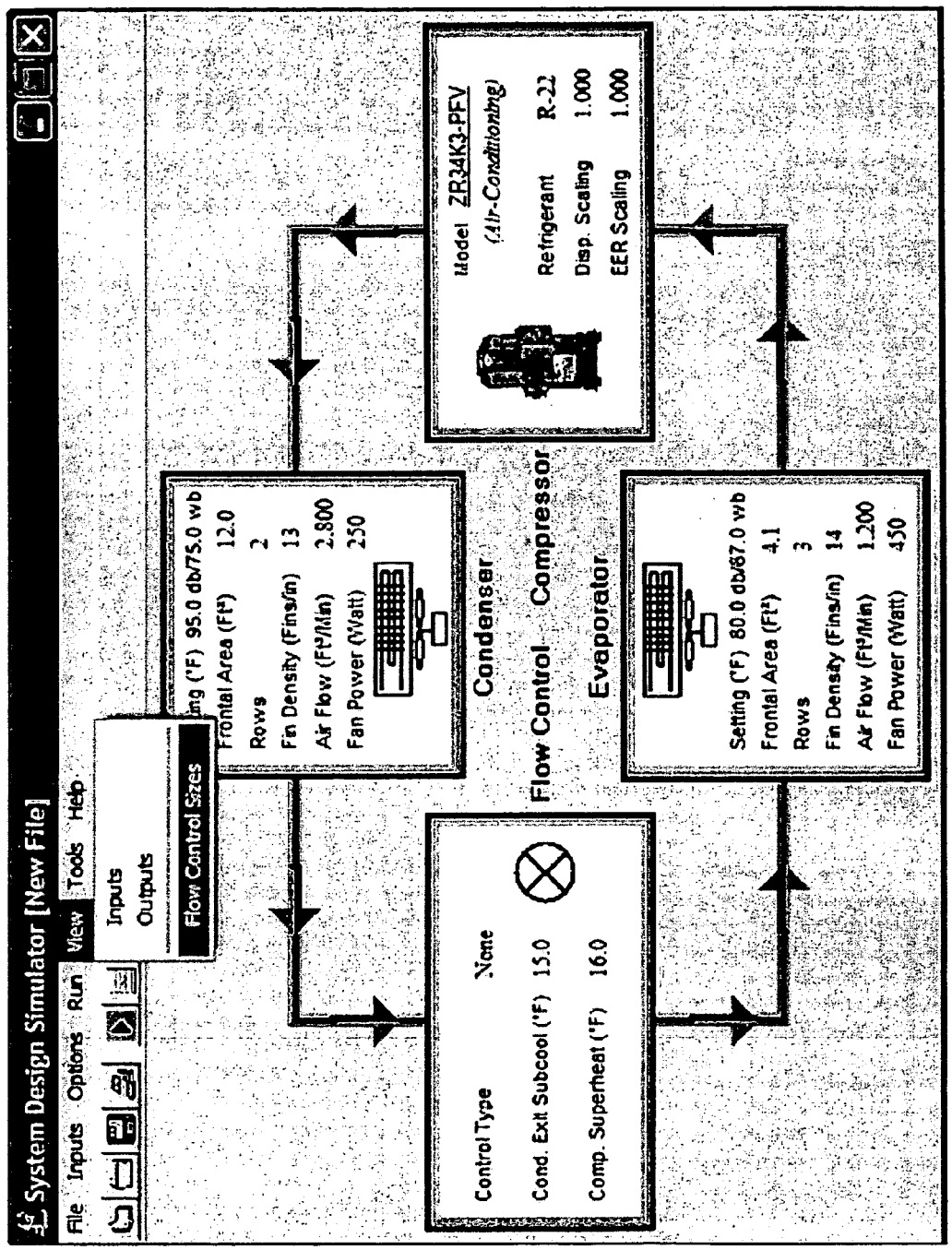
FIG. 43 is a screen-shot illustrating flow control sizes selection.
Figure 45:
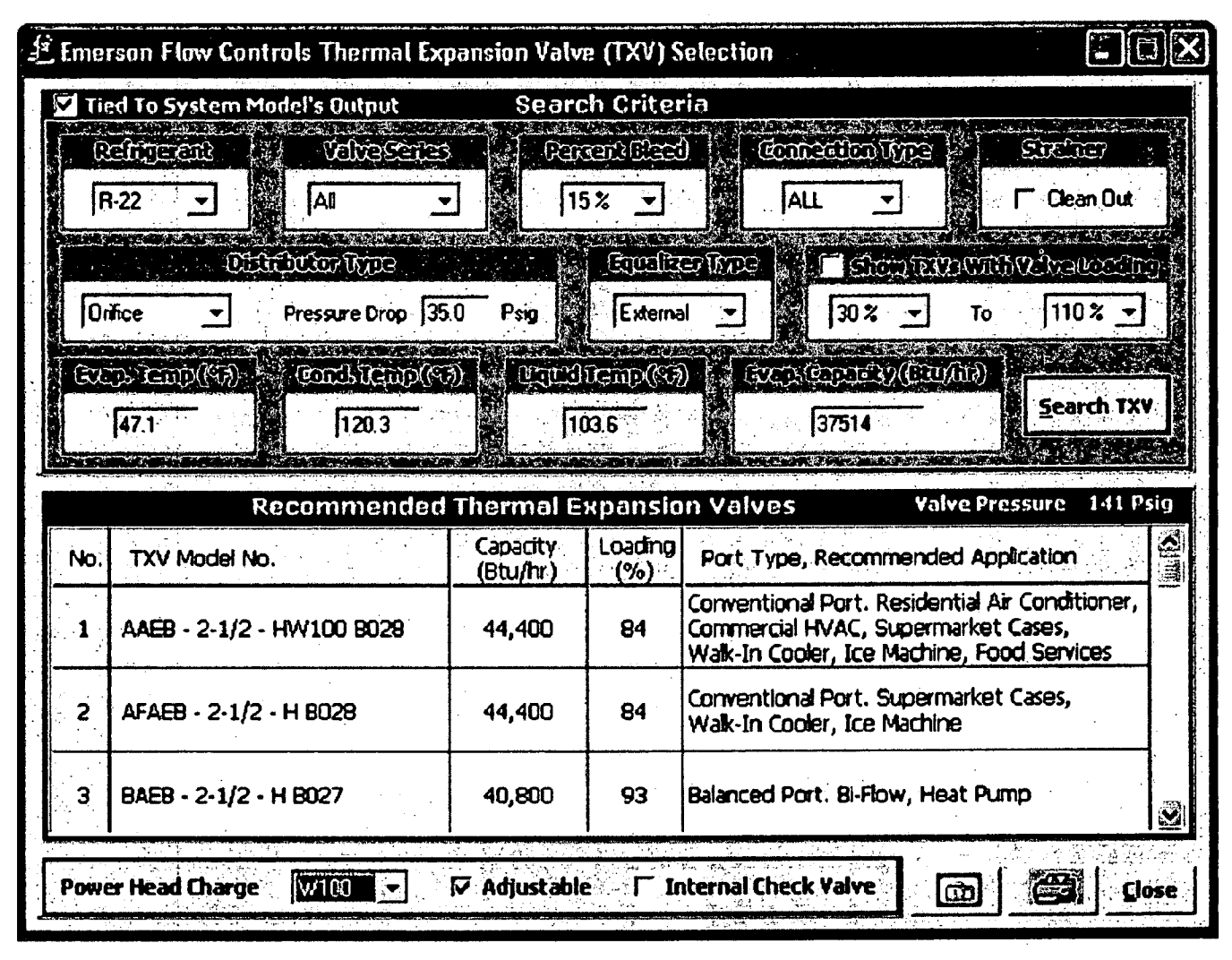

Referring now to FIGS. 43 through 45, the cooling system design simulator enables the user to view flow control device sizing based on the simulation results. To view the calculated flow control sizes the user selects View menu and Flow Control Sizes option from the main screen after running the system simulation. This capability is available only when the sub-cooling and compressor superheat option is selected as the flow control devices option. An exemplary flow control sizes screen with thermal expansion valve (TXV), capillary tube and orifice sizing parameters is illustrated in FIG. 44.

The cooling system design simulator enables a user to select a TXV based on the simulation results. This function is chosen by clicking on the Flow Controls TXV Selection button (see FIG. 44). The flow control TXV selection screen is shown in FIG. 45. Selection parameters including refrigerant, percent bleed, evaporator, condensing, liquid temperature, and evaporator capacity are automatically entered based on the results of the system simulation. A provision has been provided so that the user may directly enter the required data for selecting TXV without running the system simulation. The user may enter other selection criteria such as valve type series, connection type, strainer, distributor type and valve loading range. A list of the available TXV's corresponding to the selection inputs is provided and include the capacity, percent loading, port type and recommended application. Additionally, a digital picture of the recommended TXV (not shown) is provided.

Figure 46:
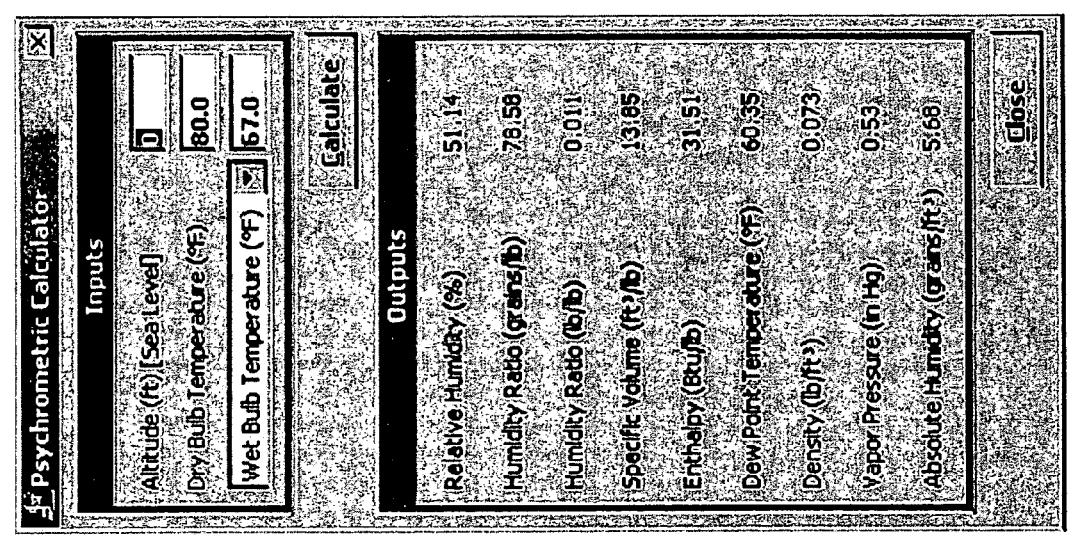

Referring now to FIG. 46, the cooling system design simulator provides a psychrometric calculator to calculate moist air properties. The user clicks on the Psychrometric Calculator option under Tools in the main menu. The inputs to the psychrometric calculator include altitude above sea level (ft), dry bulb temperature (° F.) and one of a plurality of air property inputs. The plurality of air property inputs include wet bulb temperature (° F.), relative humidity (%), humidity ratio (grains/lb), specific volume ($ft^3$/lb), enthalpy (Btu/lb) and dew point temperature (° F.). The psychrometric calculator calculates the remaining air properties and calculates further air properties including density (lbs/$ft^3$), vapor pressure (in Hg) and absolute humidity (grains/$ft^3$). The air properties are automatically transferred.

Figure 47:
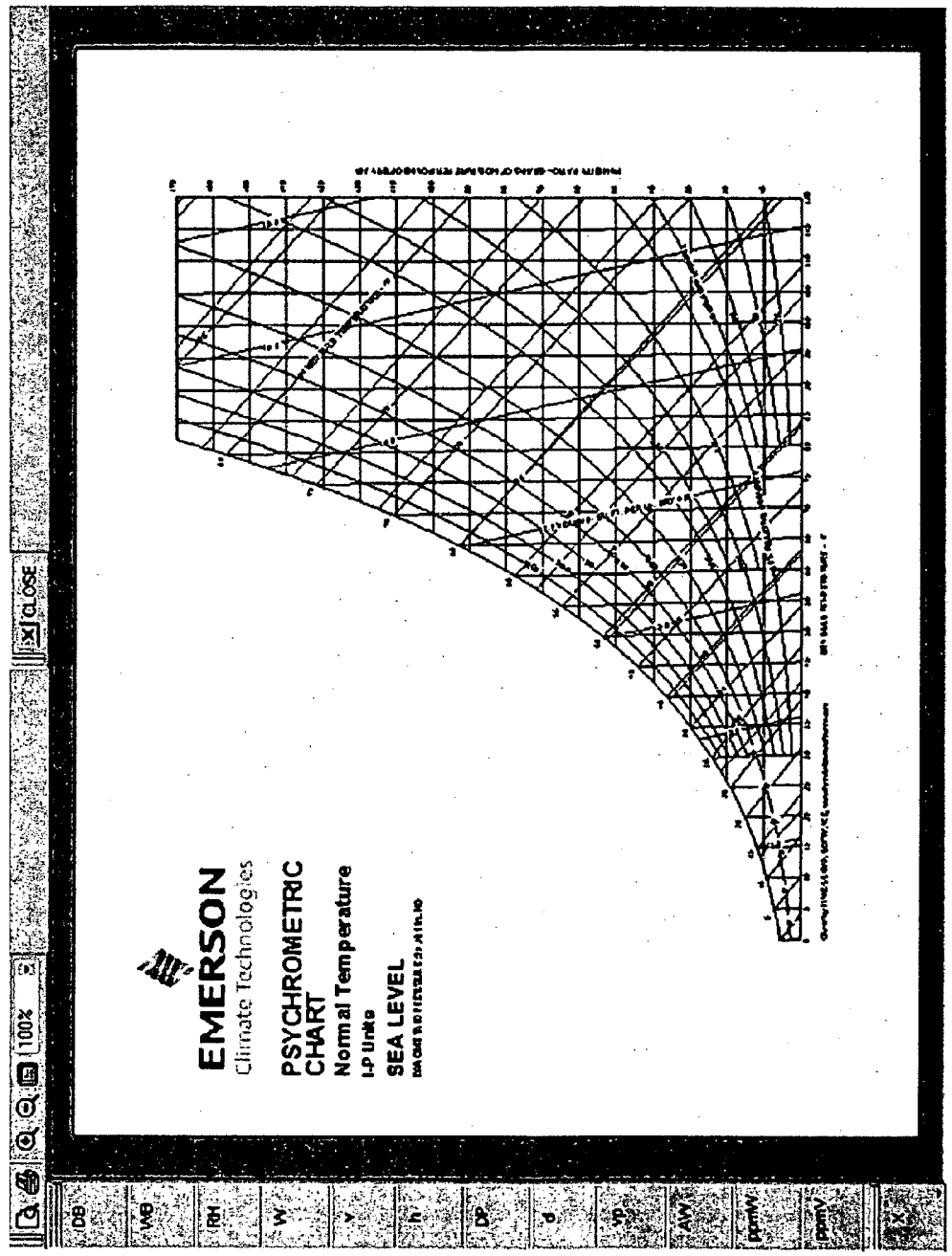
FIG. 47 is a screen shot illustrating a psychrometric chart graphically displaying moist air properties.

Referring now to FIG. 47, the moist air properties can also be determined using a psychrometric chart provided by the cooling system design simulator. The user clicks on the Psychrometric Chart option under Tools in the main menu. The inputs include minimum dry bulb temperature (° F.) and maximum dry bulb temperature (° F.). The cooling system design simulator generates the psychrometric chart based on the inputs. On the left hand side of the chart, a column provides values for dry bulb temperature (DB), wet bulb temperature (WB), relative humidity (RH), humidity ratio (W), specific volume (v), enthalpy (h), dew point temperature (DP), density (d), vapor pressure (vp), absolute humidity (AW), parts per million by weight (ppmW) and parts per million by volume (ppmV). More specifically, as the user drags the pointer across the chart, the air properties listed in the left hand column change based on the coordinates of the pointer on the chart. Therefore, the user can select a desired chart coordinate by moving the pointer to that coordinate on the chart and read the air property values from the left hand column. The user can zoom in by double-clicking on the chart.

Figure 48:
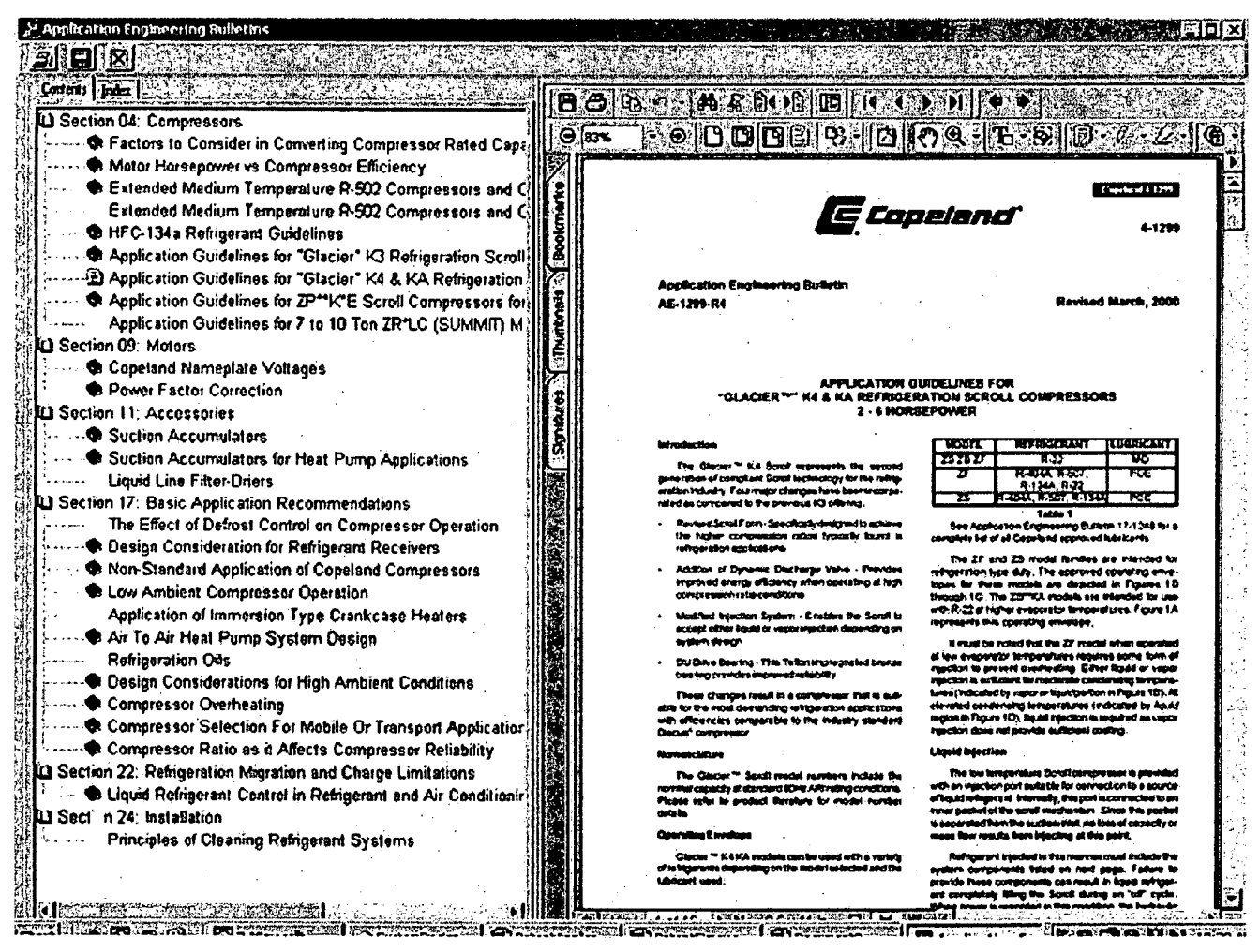

Referring now to FIG. 48, the cooling system design simulator further provides manufacturer engineering bulletins that are periodically updated. The engineering bulletins are selected by clicking the AE Bulletins option under Help in the main menu. The user can select from various contents including, but not limited to, compressors, motors, accessories, recommendations, installation and the like. A corresponding bulletin is displayed on the left half of the screen by clicking on the desired topic. In this manner, the user is continuously updated on engineering considerations when designing the cooling system. These bulletins provide helpful information to assist engineers and installers in selection and installation of cooling system components.

The cooling system design simulator simulates the performance of the individual components of a user-defined cooling system and the cooling system as a whole. The design simulator performs steady-state design and analysis of vapor compression air-to-air-systems operating in either heating and cooling modes. As a hardware-based model, a user can specify the individual component parameters and define the geometry of tubing connecting the system components. The design simulator is preferably provided as a software-based computer program and includes other complimentary functions. These include, but are not limited to, look-up tables for refrigerant and psychrometric properties of air.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of computer-based simulation of a cooling system, comprising:
    inputting condensing unit parameters and evaporator parameters for said cooling system, at least one of said condensing unit parameters and said evaporator parameters including configuration information for a heat exchanger of said cooling system, said configuration information including a number of equivalent parallel refrigerant circuits information;
    inputting compressor parameters for said cooling system;
    inputting refrigerant properties for a refrigerant flowing through said cooling system;
    processing with a computer said condensing unit parameters, said evaporator parameters, said compressor parameters and said refrigerant properties through a model of said cooling system;
    generating system outputs based on said processing;
    generating a list of flow control devices based on said system outputs; and
    selecting a flow control device from said list of flow control devices.

2. The method of claim 1 wherein said configuration information includes tube geometry information of said heat exchanger.

3. The method of claim 2 wherein said tube geometry information includes at least one of: number of rows information, horizontal tube spacing information, vertical tube spacing information, number of return bends information, outside diameter of tubing information, inside diameter of tubing information, and tubing type information.

4. The method of claim 1 wherein said configuration information includes frontal area information.

5. The method of claim 1 wherein said configuration information includes fin geometry information of said heat exchanger.

6. The method of claim 5 wherein said fin geometry information includes at least one of fin density information and fin type information.

7. The method of claim 1 further comprising generating a list of condensing units, selecting a condensing unit from said list of condensing units and automatically inputting said condensing unit parameters based on said selected condensing unit.

8. The method of claim 1 wherein said condensing unit parameters include said compressor parameters and condenser parameters.

9. The method of claim 1 wherein said flow control device includes one of a capillary tube device and an orifice device.

10. The method of claim 1 further comprising selecting a flow control parameter including a sub-cooling temperature and a superheat temperature.

11. The method of claim 1 wherein said refrigerant properties include refrigerant charge and one of refrigerant superheat temperature and refrigerant sub-cooling temperature.

12. The method of claim 1 further comprising inputting tubing and line heat transfer parameters, wherein said system outputs are further based on said tubing and line heat transfer parameters.

13. The method of claim 1 further comprising inputting accumulator parameters, wherein said system outputs are further based on said accumulator parameters.

14. A method comprising:
receiving condenser parameters, evaporator parameters and compressor parameters of a cooling system;
configuring a model of said cooling system according to said condenser parameters, said evaporator parameters and said compressor parameters;
generating at least one flow control device selection parameter with a computer simulation of said cooling system based on said configured model;
generating a list of flow control devices based on said at least one flow control device selection parameter generated by said computer simulation; and
selecting a flow control device from said list of flow control devices.

15. The method of claim 14 wherein said generating said at least one flow control device selection parameter includes generating at least one of a refrigerant type parameter, a percent bleed parameter, an evaporator temperature parameter, a condensing temperature parameter, a liquid temperature parameter, and an evaporator capacity parameter.

16. The method of claim 14 wherein said generating said at least one flow control device selection parameter includes generating a refrigerant type parameter.

17. The method of claim 14 wherein said generating said at least one flow control device selection parameter includes generating a percent bleed parameter.

18. The method of claim 14 wherein said generating said at least one flow control device selection parameter includes generating an evaporator temperature parameter.

19. The method of claim 14 wherein said generating said at least one flow control device selection parameter includes generating a condensing temperature parameter.

20. The method of claim 14 wherein said generating said at least one flow control device selection parameter includes generating a liquid temperature parameter.

21. The method of claim 14 wherein said generating said at least one flow control device selection parameter includes generating an evaporator capacity parameter.

22. The method of claim 14 wherein said at least one flow control device includes one of a capillary tube device and an orifice device.

23. The method of claim 14 further comprising receiving properties for a refrigerant flowing through said cooling system, wherein said configuring includes configuring said model according to said refrigerant properties.

24. The method of claim 23 wherein said properties include refrigerant charge and one of refrigerant superheat temperature and refrigerant sub-cooling temperature.

25. The method of claim 14 further comprising generating a list of condensers, receiving a selected condenser from said list of condensers and automatically inputting said condenser parameters based on said selected condenser.

26. The method of claim 14 further comprising generating a list of compressors based on search parameters, receiving a selected compressor from said list of compressors and automatically inputting said compressor parameters based on said selected compressor.

27. The method of claim 26 wherein said search parameters include at least one of a model number, a voltage, a phase, a frequency, a refrigerant type, an application type and a capacity.

28. The method of claim 26 wherein said search parameters include a capacity and a capacity tolerance.

29. The method of claim 14 further comprising receiving tubing and line heat transfer parameters, wherein said configuring includes configuring said model according to said tubing and line heat transfer parameters.

30. The method of claim 14 further comprising receiving accumulator parameters, wherein said configuring includes configuring said model according to said accumulator parameters.

31. The method of claim 14 wherein said condenser parameters and said compressor parameters are inputted as air-cooled condensing unit parameters.

32. The method of claim 31 further comprising generating a list of air-cooled condensing units, receiving a selected air-cooled condensing unit from said list of air-cooled condensing units and automatically inputting said air-cooled condensing unit parameters based on said selected air-cooled condensing unit.

33. A method comprising:
receiving condenser parameters, evaporator parameters and compressor parameters for a cooling system;
receiving a dry bulb temperature;
receiving at least one first air property input including at least one of a wet bulb temperature, a relative humidity, a humidity ratio, a specific volume, an enthalpy, and a dew point temperature;
calculating at least one second air property input based on said dry bulb temperature and said at least one first air property input, said at least one second air property input including at least one of said wet bulb temperature, said relative humidity, said humidity ratio, said specific volume, said enthalpy, and said dew point temperature;
configuring a model of said cooling system according to said condenser parameters, said evaporator parameters, said compressor parameters, said at least one first air property input, and said at least one second air property input;

generating an output with a computer simulation of said cooling system based on said configured model.

34. The method of claim 33 further comprising receiving a sea level, wherein said calculating includes calculating said at least one second air property input based on said sea level.

35. The method of claim 33 further comprising calculating an air density, wherein said configuring includes configuring said model according to said air density.

36. The method of claim 33 further comprising calculating a vapor pressure, wherein said configuring includes configuring said model according to said vapor pressure.

37. The method of claim 33 further comprising calculating an absolute humidity, wherein said configuring includes configuring said model according to said absolute humidity.

38. The method of claim 33 wherein at least one of said condenser parameters and said evaporator parameters includes configuration information for a heat exchanger of said cooling system.

39. The method of claim 38 wherein said configuration information includes tube geometry information of said heat exchanger.

40. The method of claim 38 wherein said configuration information includes at least one of frontal area information and number of equivalent parallel refrigerant circuits information.

41. The method of claim 38 wherein said configuration information includes fin geometry information of said heat exchanger.

42. The method of claim 38 wherein said configuration information includes a number of equivalent parallel refrigerant circuits information.

43. The method of claim 32 wherein said tube geometry information includes at least one of: number of rows information, horizontal tube spacing information, verticle tube spacing information, number of return bends information, outside diameter of tubing information, inside diameter of tubing information, and tubing type information.

44. The method of claim 35 wherein said fin geometry information includes at least one of fin density information and fin type.

45. The method of claim 33 wherein said calculating includes generating an air properties table based on said dry bulb temperature.

46. The method of claim 33 wherein said calculating includes generating an air properties graph based on said dry bulb temperature.

47. The method of claim 33 further comprising selecting a flow control device based on said output.

48. The method of claim 47 wherein said flow control device includes one of a capillary tube device and an orifice device.

49. The method of claim 47 further comprising selecting a flow control parameter including a sub-cooling temperature and a superheat temperature.

50. The method of claim 47 wherein said step of selecting a flow control device includes generating a list of flow control devices based on said output and selecting said flow control device from said list of flow control devices.

51. The method of claim 33 further comprising receiving properties for a refrigerant flowing through said cooling system, wherein said configuring includes configuring said model according to said refrigerant properties.

52. The method of claim 51 wherein said properties include refrigerant charge and one of refrigerant superheat temperature and refrigerant sub-cooling temperature.

53. The method of claim 33 wherein said receiving condenser parameters includes generating a list of condensers, receiving a selected condenser from said list of condensers and automatically inputting said condenser parameters based on said selected condenser.

54. The method of claim 33 wherein said receiving compressor parameters includes generating a list of compressors based on search parameters, receiving a selected compressor from said list of compressors and automatically inputting said compressor parameters based on said selected compressor.

55. The method of claim 54 wherein said search parameters include at least one of a model number, a voltage, a phase, a frequency, a refrigerant type, an application type and a capacity.

56. The method of claim 55 wherein said search parameters include a capacity and a capacity tolerance.

57. The method of claim 33 further comprising receiving tubing and line heat transfer parameters, wherein said configuring includes configuring said model according to said tubing and line heat transfer parameters.

58. The method of claim 33 further comprising receiving accumulator parameters, wherein said configuring includes configuring said model according to said accumulator parameters.

59. The method of claim 33 wherein said condenser parameters and said compressor parameters are received as air-cooled condensing unit parameters.

60. The method of claim 59 further comprising generating a list of air-cooled condensing units, receiving a selected air-cooled condensing unit from said list of air-cooled condensing units and automatically inputting said air-cooled condensing unit parameters based on said selected air-cooled condensing unit.

* * * * *

UNITED STATES PATENT AND TRADEMARK OFFICE
CERTIFICATE OF CORRECTION

PATENT NO. : 7,606,683 B2
APPLICATION NO. : 10/765820
DATED : October 20, 2009
INVENTOR(S) : Vijay Bahel et al.

It is certified that error appears in the above-identified patent and that said Letters Patent is hereby corrected as shown below:

| | |
|---|---|
| Column 2, Line 14 | "the output" should be --The output--. |
| Column 4, Line 45 | "complimentary" should be --complementary--. |
| Column 6, Line 61 | "(no shown)" should be --(not shown)--. |
| Column 6, Line 62 | "users" should be --user's--. |
| Column 12, Line 31 | "complimentary" should be --complementary--. |
| Column 15, Line 32 | "claim 32" should be --claim 39--. |
| Column 15, Line 38 | "claim 35" should be --claim 41--. |
| Column 15, Line 40 | After "fin type", insert --information--. |

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,606,683 B2 Page 1 of 1
APPLICATION NO. : 10/765820
DATED : October 20, 2009
INVENTOR(S) : Bahel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1321 days.

Signed and Sealed this

Fourteenth Day of December, 2010

David J. Kappos
*Director of the United States Patent and Trademark Office*